May 3, 1966 S. GEMBICKI 3,249,068
BAKERY MACHINE

Filed June 18, 1962 16 Sheets-Sheet 1

Inventor
Stanley Gembicki
By Hofgren, Brady
Wegner, Allen & Stellman
Attorneys

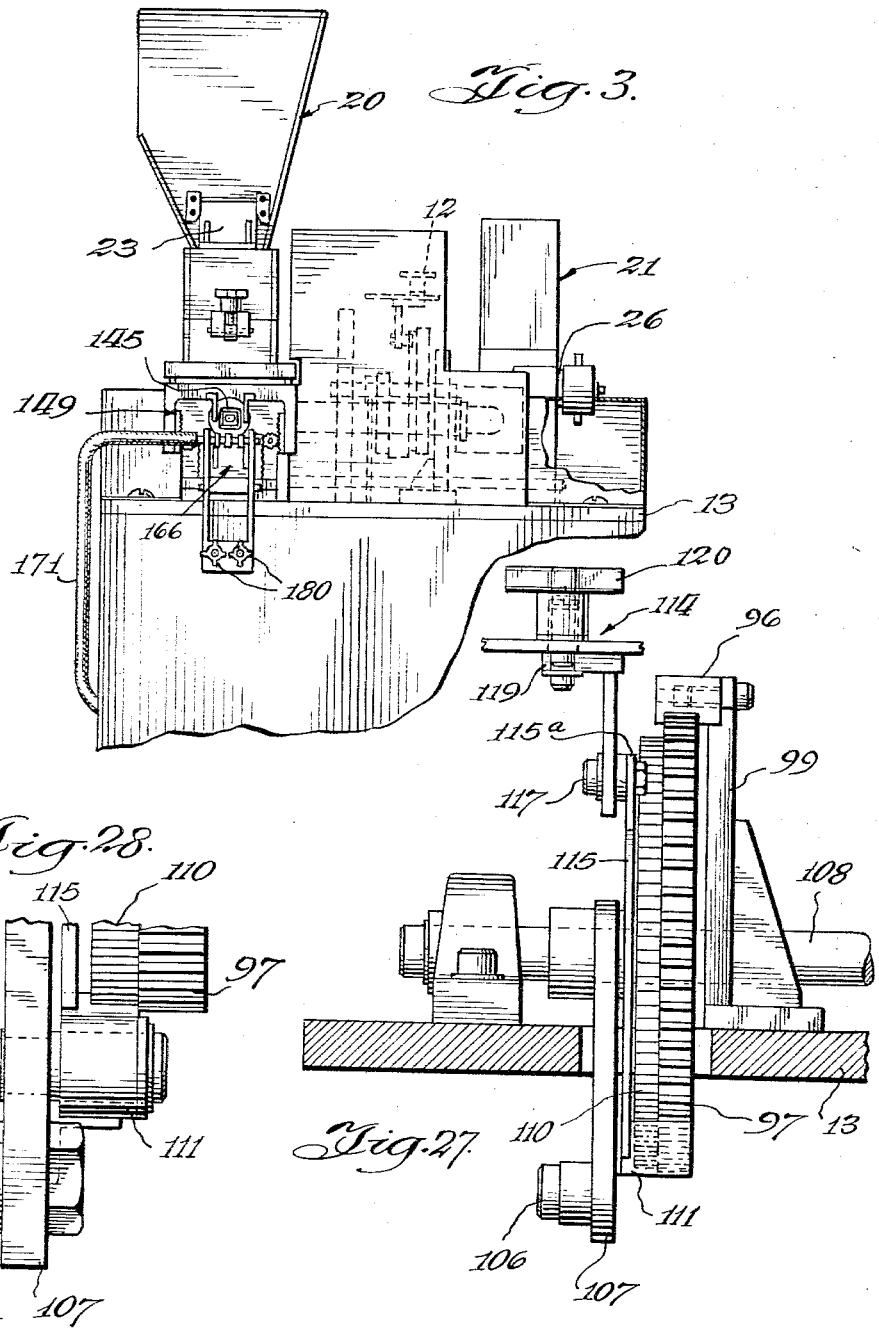

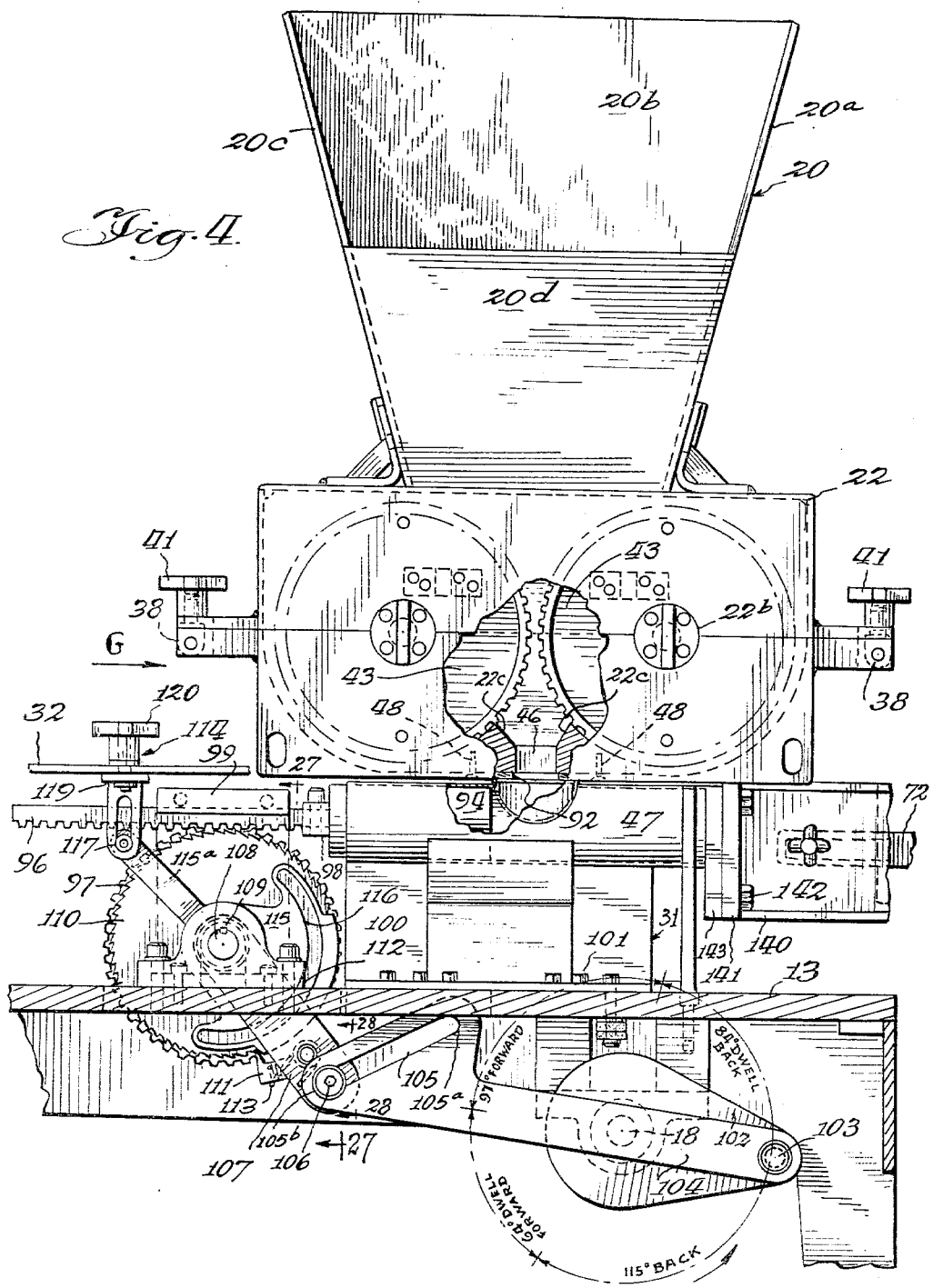

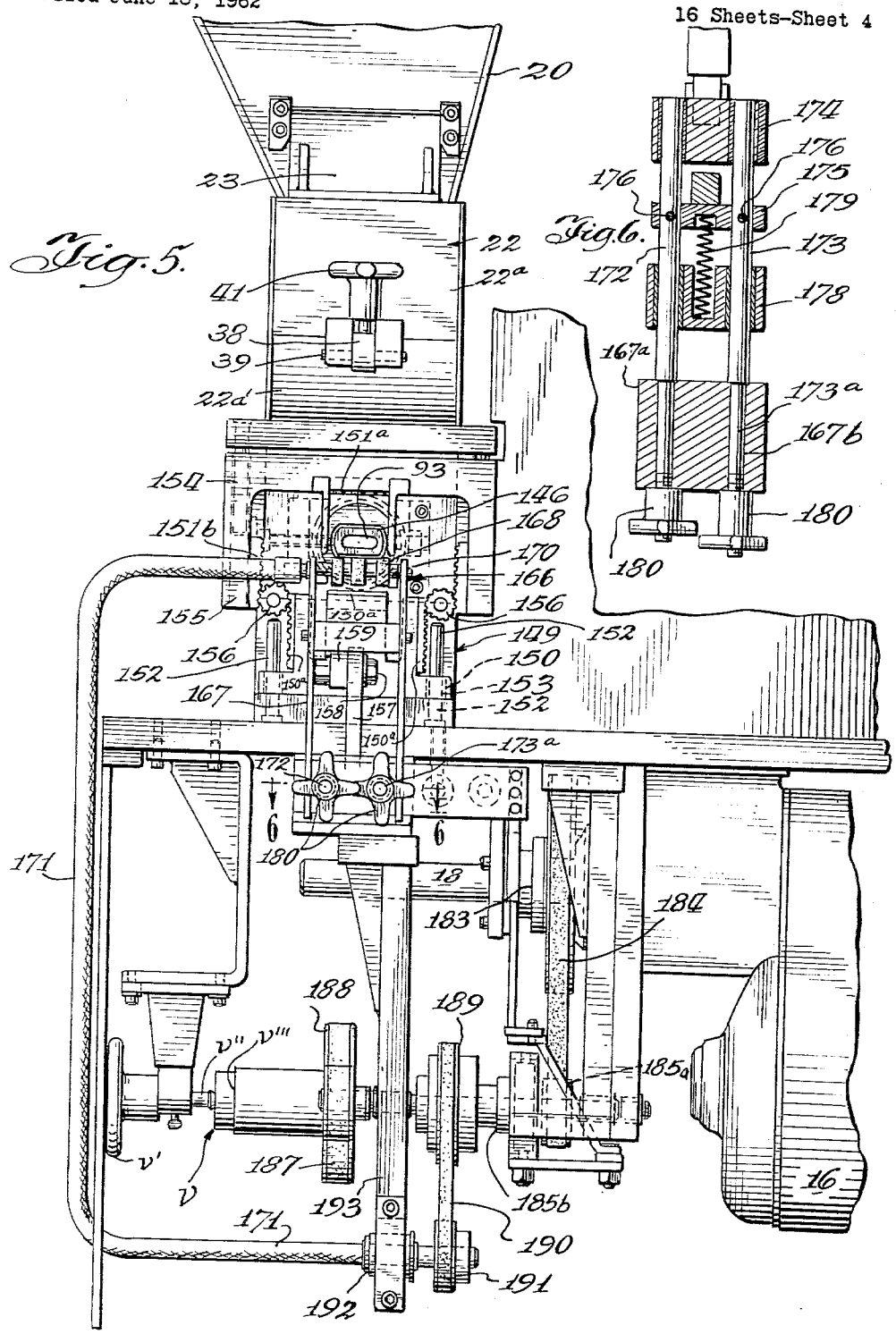

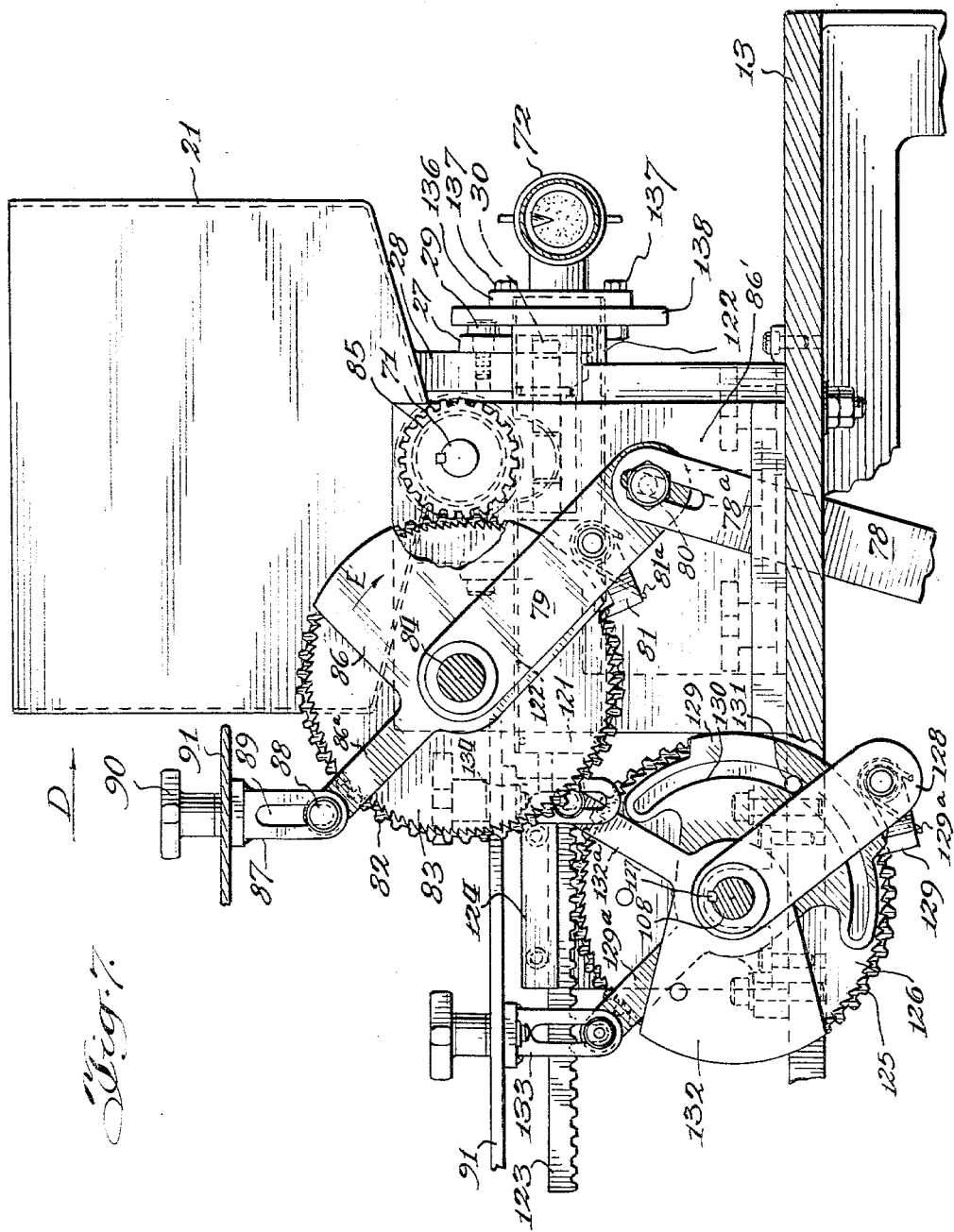

May 3, 1966 S. GEMBICKI 3,249,068
BAKERY MACHINE
Filed June 18, 1962 16 Sheets-Sheet 8

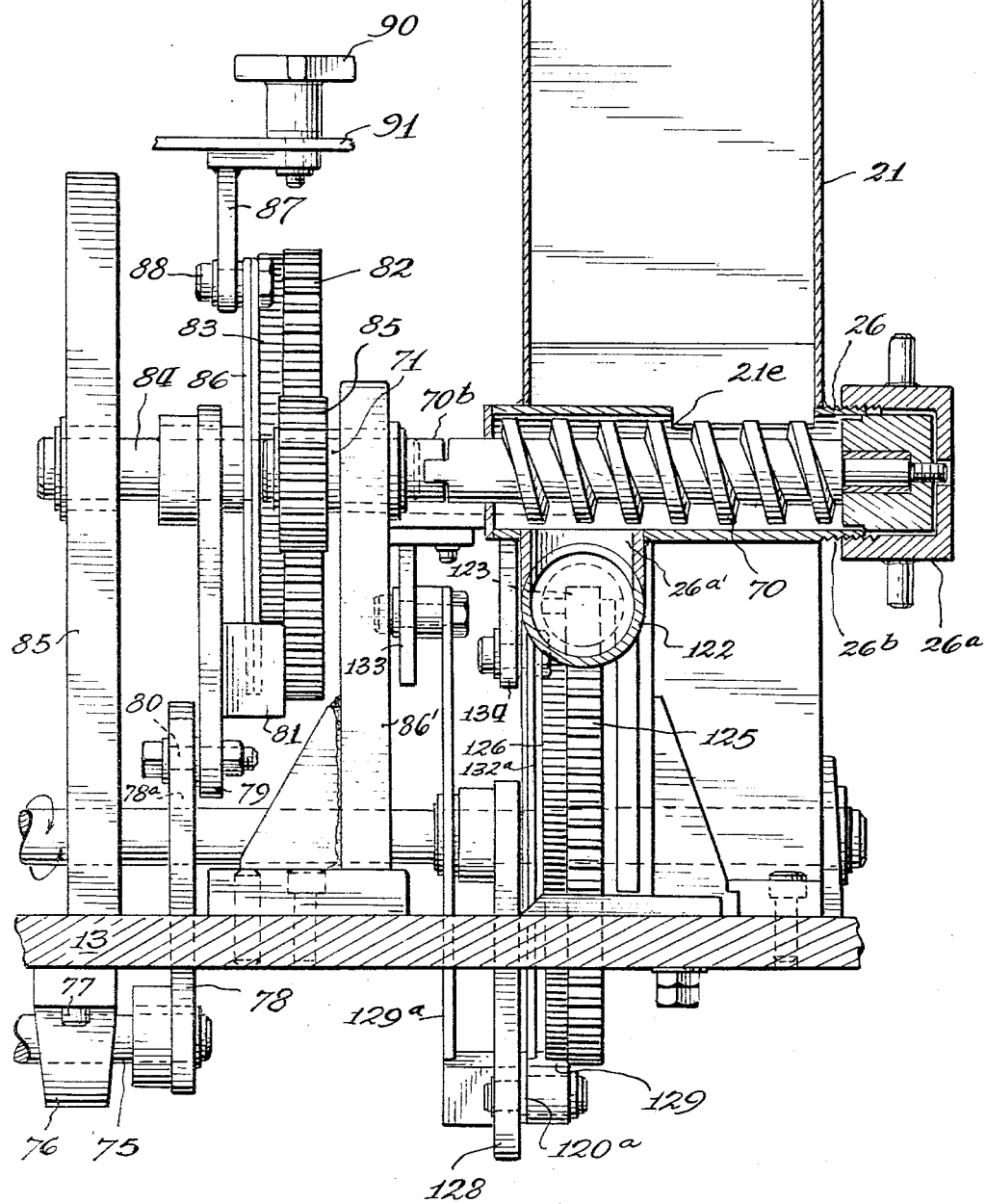

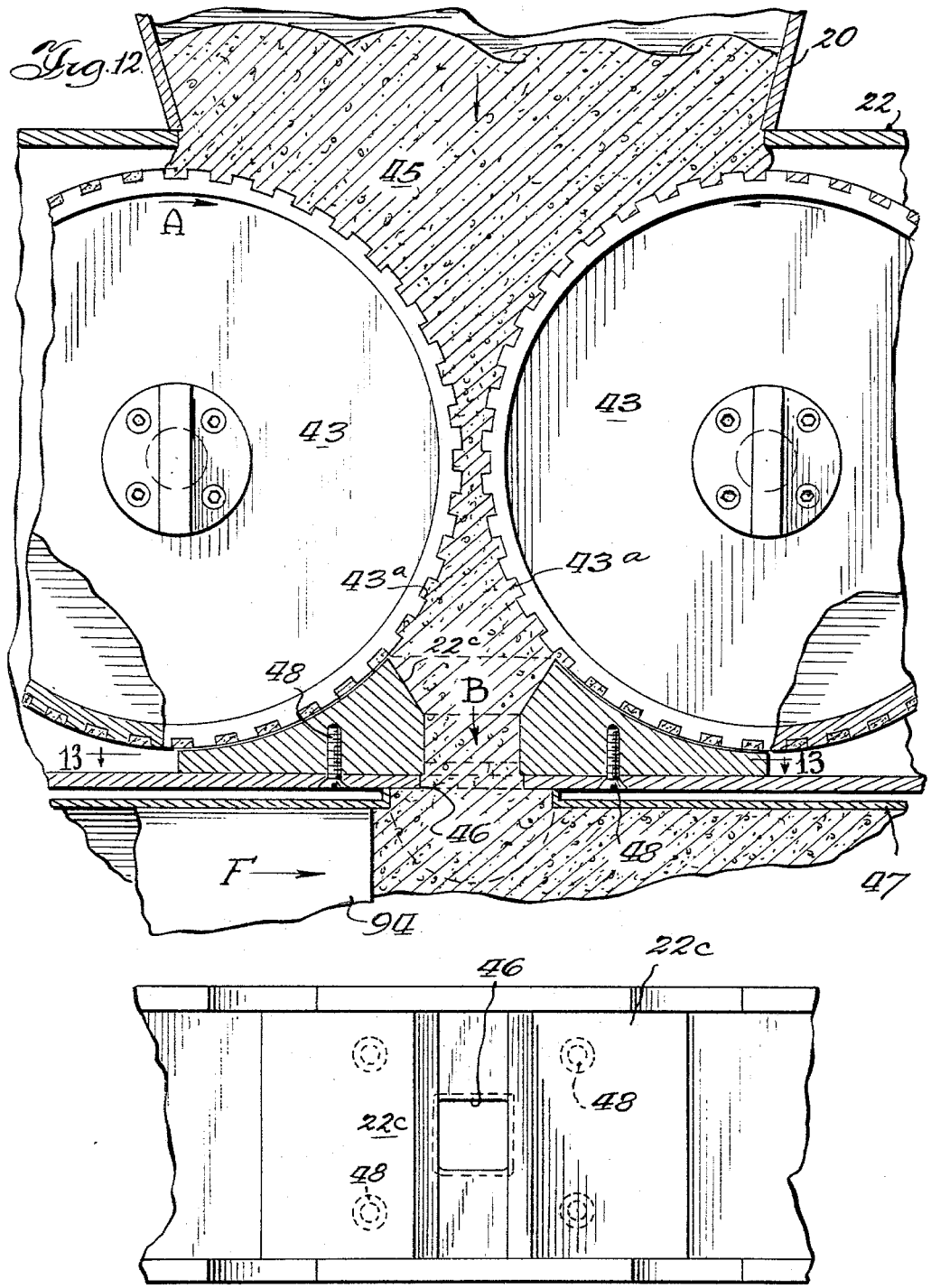

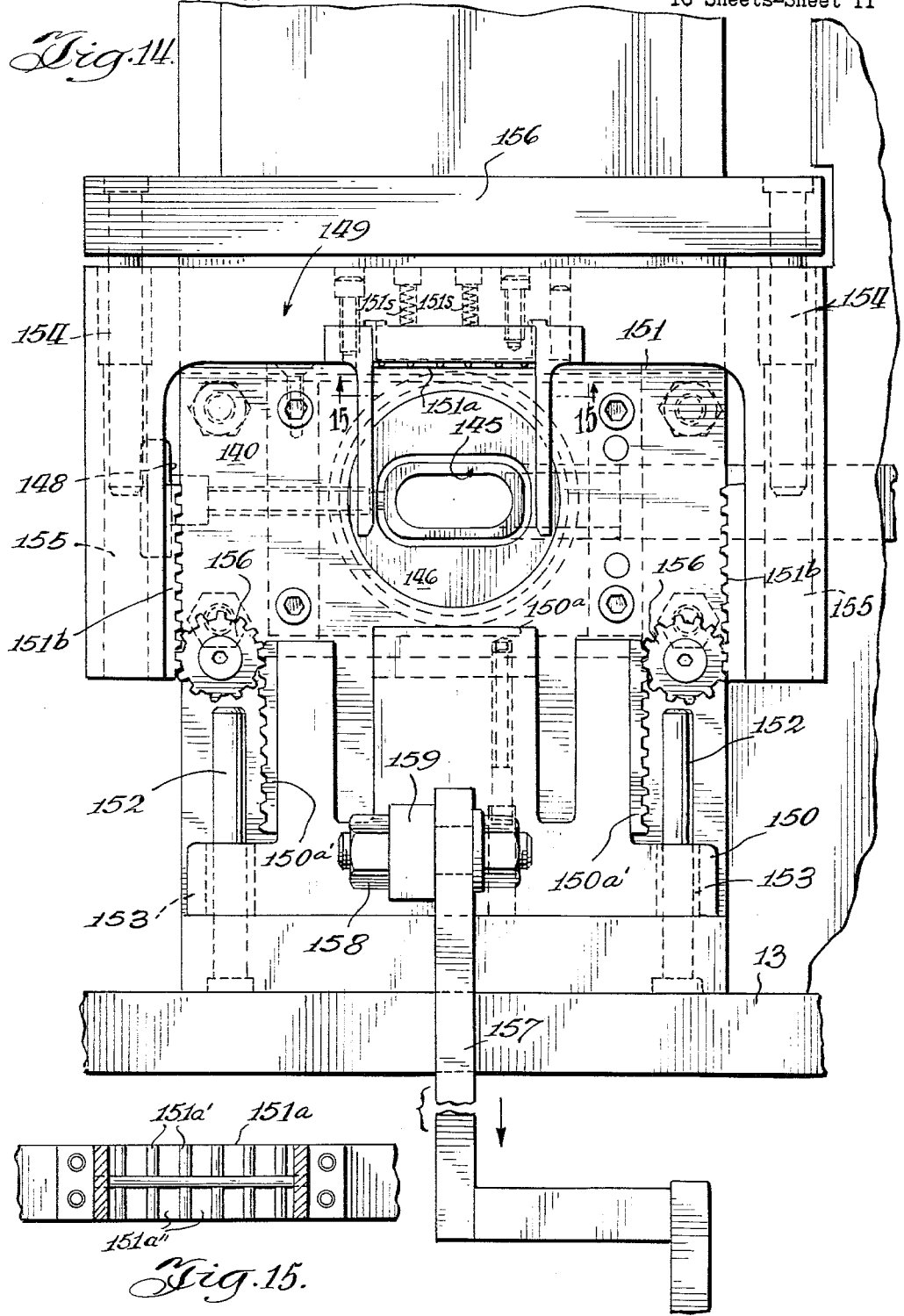

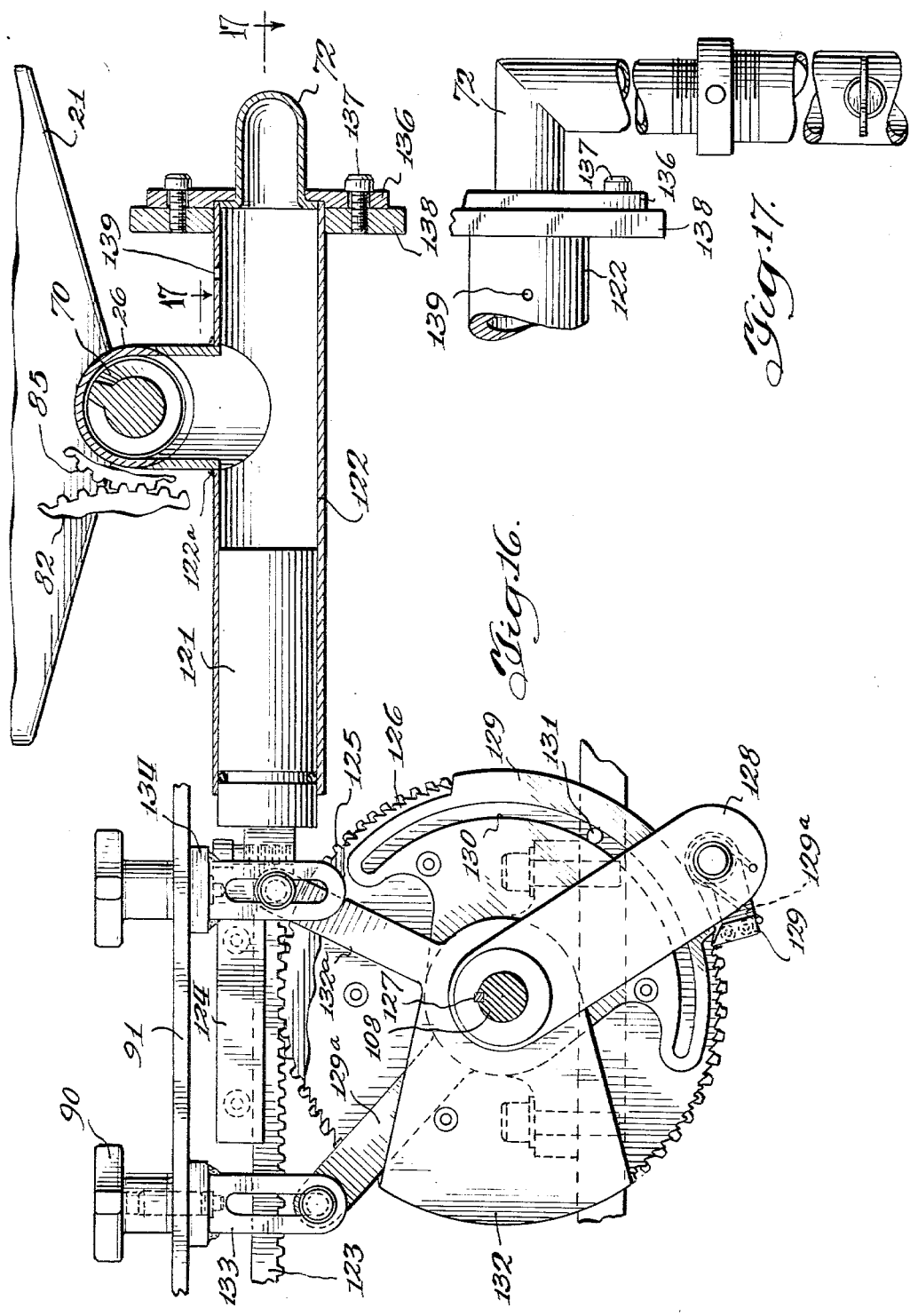

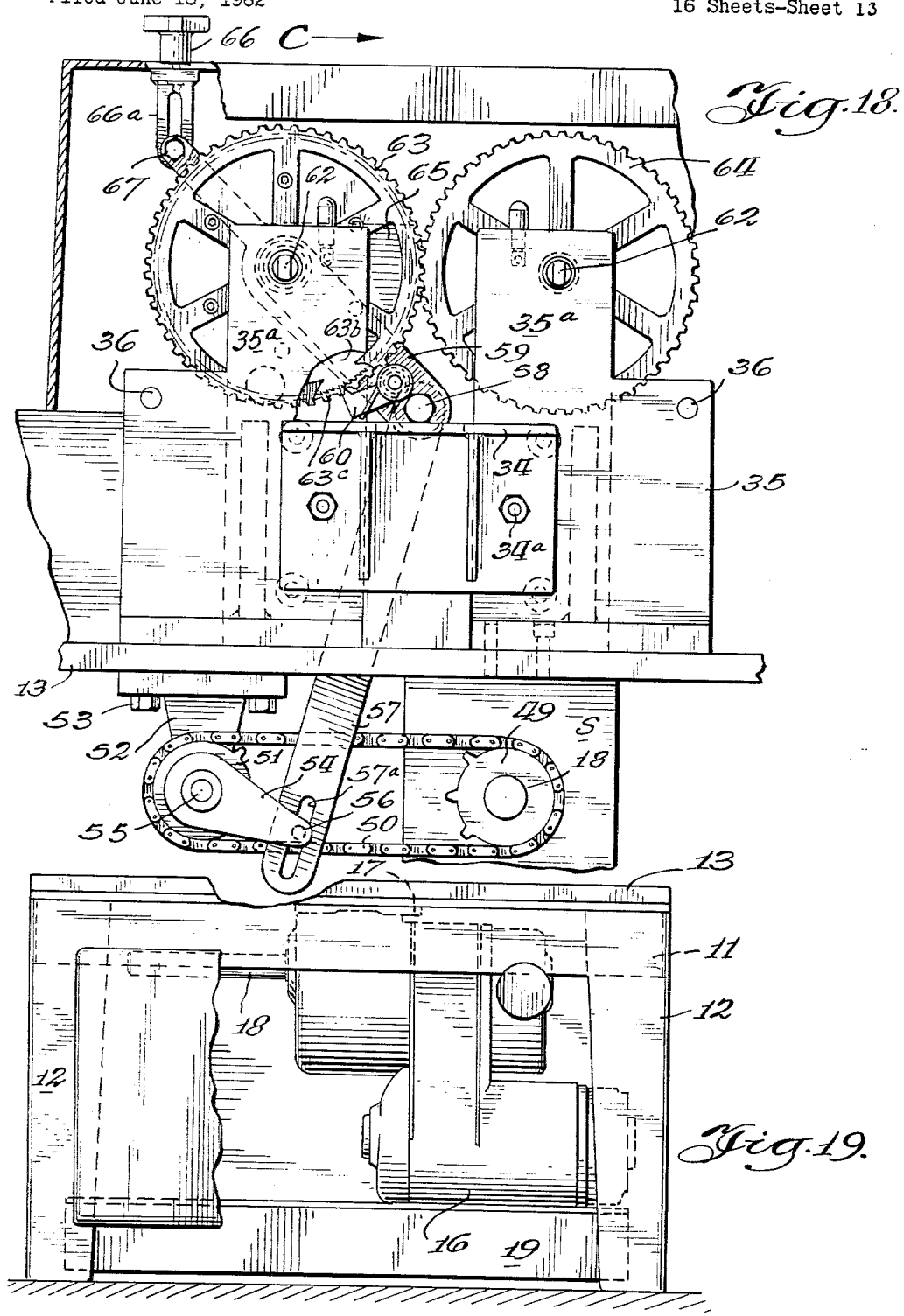

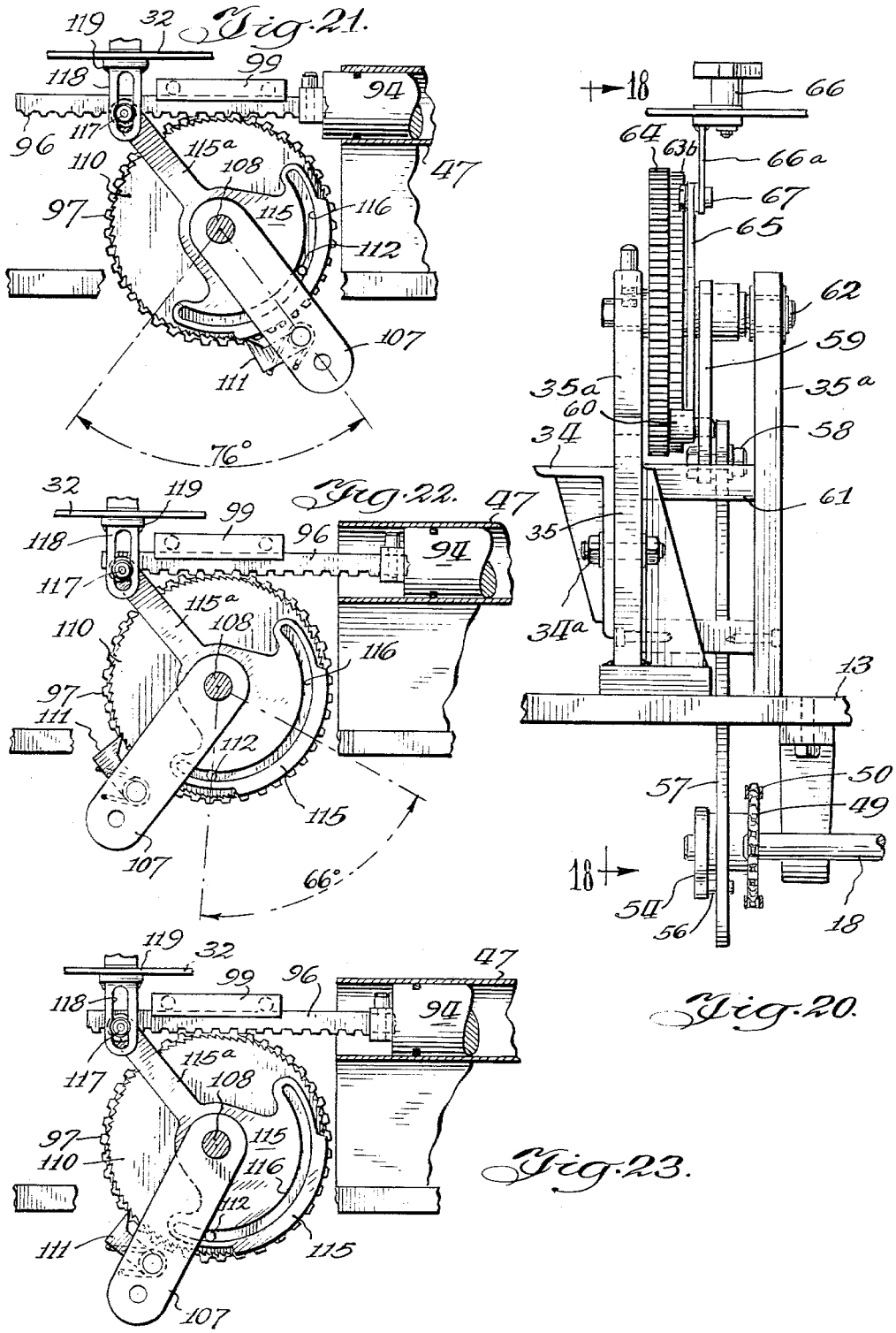

May 3, 1966 S. GEMBICKI 3,249,068
BAKERY MACHINE
Filed June 18, 1962 16 Sheets-Sheet 15

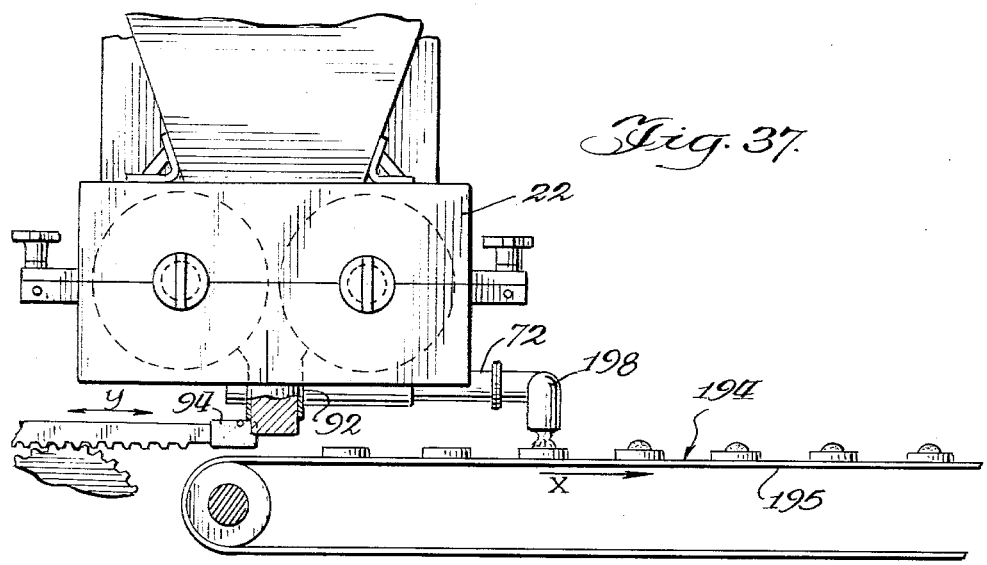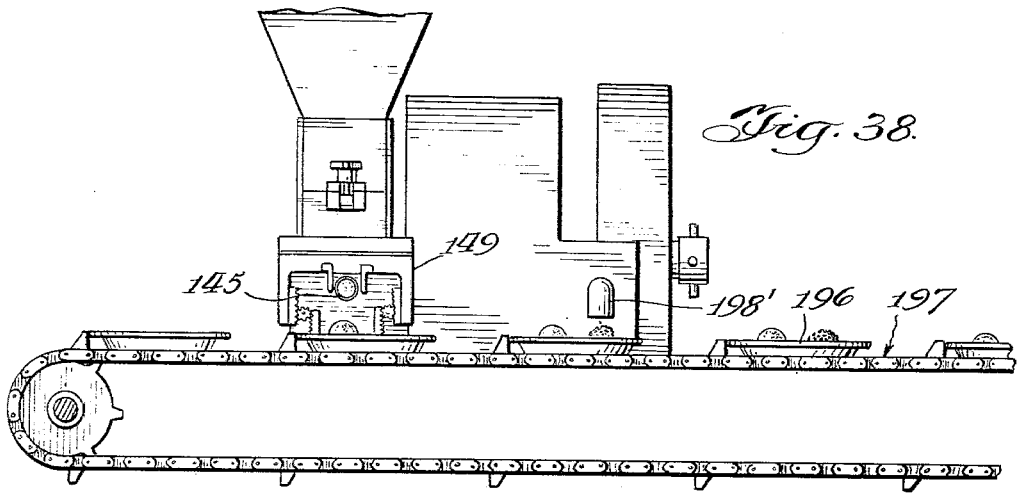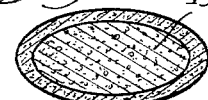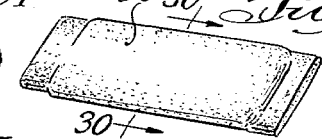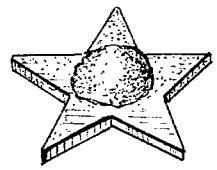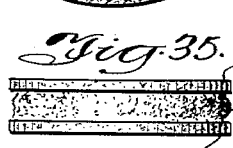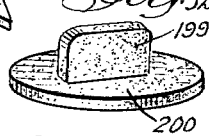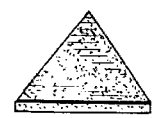

United States Patent Office 3,249,068
Patented May 3, 1966

3,249,068
BAKERY MACHINE
Stanley Gembicki, Des Plaines, Ill., assignor to Marlan Company, a corporation of Illinois
Filed June 18, 1962, Ser. No. 203,110
28 Claims. (Cl. 107—1)

This invention relates to a bakery machine and more particularly to an automatic device which is adapted to produce bakery goods and portion controlled food products, filled or unfilled, in numerous controlled shapes and sizes.

By and large, the majority of bakery and portion controlled food products sold to the public such as filled items like pies, cakes, cookies and the like, are produced by hand and require substantially more power and production floor space. In some instances, partial automation is used but even in such cases many of the products are normally produced mostly by hand. With the state of organized labor and thereby the resulting labor cost, it is obvious that such a method of production adds substantially to the price of such goods. With the present high cost of labor and the shortage of skilled personnel it becomes obvious that the labor cost in many instances exceeds the raw material cost.

Moreover, in the majority of commercial food dispensing establishments, such as restaurant counters and the like, it is not possible to produce fresh bakery and portion controlled items to be sold on the spot. Most of the goods are purchased in a frozen condition, and then cooked at the restaurant. The same is true of large institutional feeding establishments such as colleges, prisons, in-plant feeding, the armed services and the like, since quite obviously the production of the bakery goods at these locations would be too expensive a procedure and would require too large a staff of trained employees.

The bakery and portion controlled food products machine of this invention overcomes all of the disadvantages mentioned above, since it is capable of substantially automatically producing most of the conventionally sold bakery and portion controlled food products, and further, is capable of producing these products at a greatly increased speed and uniformity. Only limited floor space is used and a single operator provides the necessary materials from which the bakery and portion controlled food products are made.

It is therefore an object of this invention to provide a bakery and portion controlled food products machine of the character described which is capable of automatically producing bakery goods and portion controlled food products.

It is yet another object of this invention to provide such a machine with greatly increased production and with a decrease in the amount of manpower and floor space necessary for operation.

It is still another object of this invention to provide an automatic device of the character described which includes a frame, a form defining die on the frame which is adapted to form dough into a desired shape as it passes therethrough and means mounted in cooperation with the die and adapted to pass an amount of said dough through said die.

It is still a further object of this invention to provide an automatic device of the character described similar to the device mentioned in the paragraph above but including in addition, means which cooperate with the first named means to apply a filling material to the dough as it passes through the die.

It is yet a further object of this invention to provide an automatic device of the character described which includes a frame and a form defining die and means for passing dough through said die as already mentioned, and in addition container means mounted in cooperation with the first named means for supplying the predetermined and measured amount of dough to the first named means for passage through the die.

It is still a further object of this invention to provide a device of the character described having the structure mentioned in the paragraph above and in addition the filling means already mentioned and applying means mounted in cooperation with the filling material means and adapted to provide a measured and predetermined amount of filling material for application to the dough.

It is still another object of this invention to provide an automatic device of the character described which hav severing means mounted in cooperation with the die and adapted to separate the products into individual units as the dough emerges from the die.

It is yet another object of this invention to produce an automatic device such as that described in the paragraph above including in addition a conveyor means mounted on the frame adjacent the die and severing means, and adapted to receive the individual units after they are severed and to carry said unit away from said device.

Other objects and advantages of the invention will become apparent from the following description taken together with the accompanying drawings.

In the drawings:

FIGURE 3 is a partial front elevational view of the machine partly broken away in section and also showing some interior construction in phantom lines;

FIGURE 4 is an enlarged partial sectional view partly broken away taken substantially along the line 4—4 of FIGURE 2 and showing some interior construction in phantom lines;

FIGURE 5 is an enlarged partial view of the left-hand portion of FIGURE 3 with the skirt removed to show inner construction and showing other interior construction in phantom lines;

FIGURE 6 is a sectional view taken substantially along the line 6—6 of FIGURE 5;

FIGURE 7 is an enlarged partial sectional view taken substantially along the line 7—7 of FIGURE 2 and showing some interior construction in phantom lines;

FIGURE 11 is an enlarged partial sectional view taken substantially along the line 11—11 of FIGURE 2;

FIGURE 12 is an enlarged partial sectional view of the filling rolls shown mostly in phantom in FIGURE 4;

FIGURE 13 is an enlarged partial sectional view taken substantially along the line 13—13 of FIGURE 12;

FIGURE 14 is an enlarged partial view taken substantially along the line 14—14 of FIGURE 2;

FIGURE 15 is a partial view taken substantially along the line 15—15 of FIGURE 14;

FIGURE 16 is an enlarged partial sectional view partly broken away taken substantially along the line 16—16 of FIGURE 2 and showing certain hidden portions in dotted lines;

FIGURE 17 is a partial view taken substantially along the line 17—17 of FIGURE 16;

FIGURE 18 is an enlarged partial sectional view taken substantially along the line 18—18 of FIGURE 2 and 18—18 of FIGURE 20 showing certain hidden elements in dotted lines;

FIGURE 19 is a partial semi-diagrammatic front elevational view showing the location of the main power source;

FIGURE 20 is an enlarged partial sectional view taken substantially along the line 20—20 of FIGURE 2 and showing certain hidden elements in dotted lines;

FIGURES 21, 22 and 23 are partial side views of various positions of the piston drive shown in FIGURE 4;

FIGURE 27 is an enlarged partial sectional view taken substantially along the line 27—27 of FIGURE 4 but without showing the drive connection;

FIGURE 28 is an enlarged partial sectional view taken substantially along the line 28—28 of FIGURE 4;

FIGURES 29–36 are views of various portion controlled food products resulting from the bakery and portion controlled food products machine of this invention;

FIGURE 37 is a diagrammatic view of a modification of the bakery and portion controlled food products machine of this invention;

FIGURE 38 is a diagrammatic view of yet another modification of the bakery and portion controlled food products machine of this invention; and FIGURE 39 is a view taken along the line 39—39 of FIGURE 9.

Figures 1, 2:
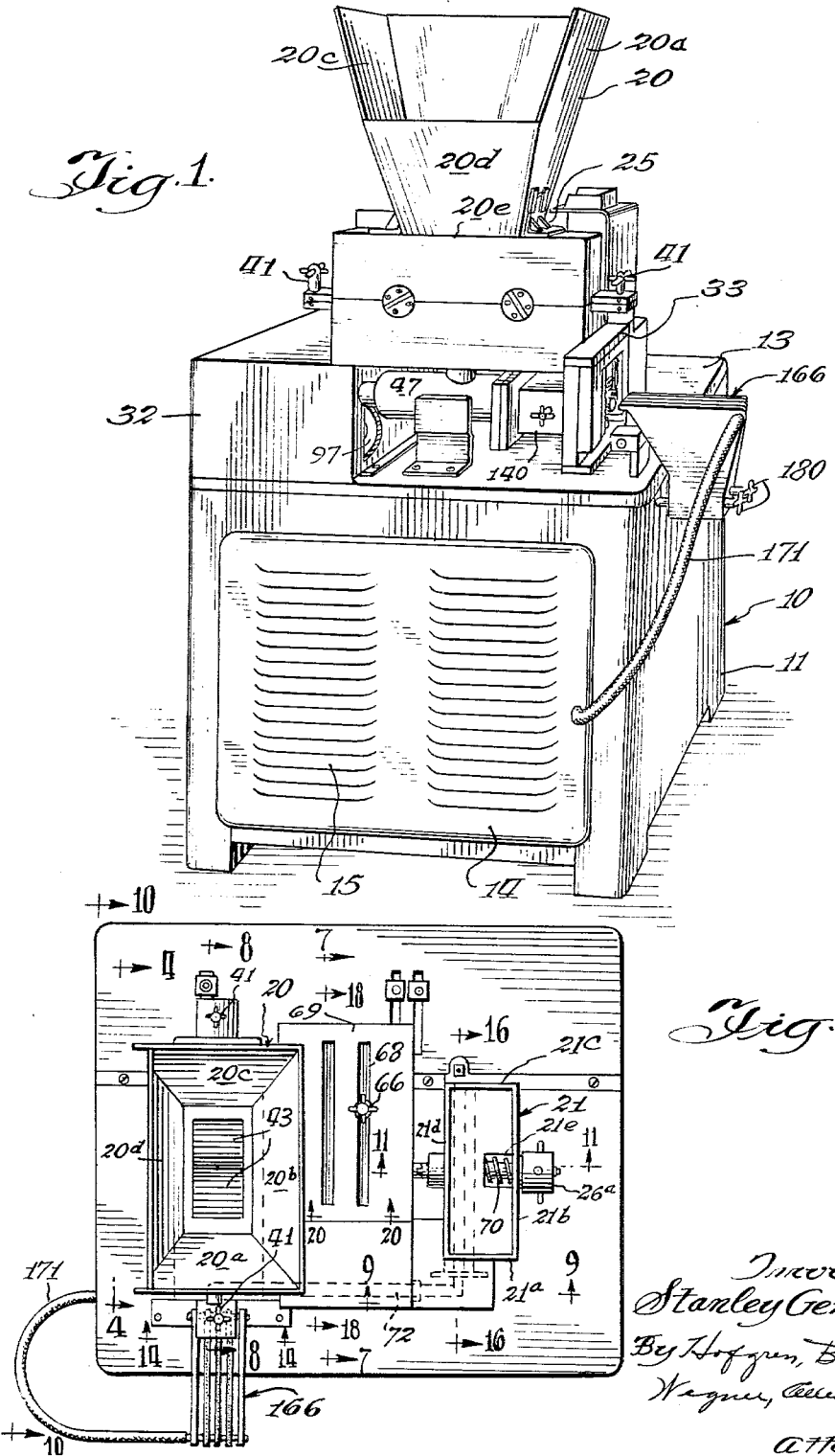
FIGURE 1 is a perspective view of the bakery and portion controlled food products machine of this invention.
FIGURE 2 is a top plan view of the machine.

In FIGURE 1 there is shown a perspective view of the bakery and portion controlled food products machine of this invention. Since there are several component sections which go to make up the machine, it is felt for clarity of description and ease in understanding, it would be wiser to break this description up into those sections. For that reason, the machine will be discussed as follows:

(1) Frame and Drive Motor
(2) Ingredient Hoppers
(3) Hopper Rollers Drive and Operation
(4) Filling Hopper Drive and Control
(5) Dough or Enrobing Piston Drive and Controls
(6) Filling Piston Drive and Controls
(7) Filling Piping and Air By-Pass and Relief
(8) Cutting and Sealing Mechanism
(9) Conveyor System
(10) Operation Each of these segments will be taken up separately and their conjoint operation will then be explained under Section 10 entitled Operation.

1. Frame and drive motor

The frame 11 on which the bakery and portion controlled food products machine 10 of this invention is mounted, can probably best be seen in FIGURES 1 and 19. It will be noted that the frame is, in effect, a metal table or the like, which has four legs 12 and a sanitary top 13. The frame is also provided with removable side covers 14 for service, having a plurality of louvers 15 to allow ventilation. Mounted underneath the table frame 11 is the drive motor 16. The motor is secured to the underside of the table as by bolts at 17. The motor 16 is of a conventional electric variety having a single drive output shaft 18 of controllable r.p.m. from which the entire drive of the bakery machine of this invention is taken. A support 19 disposed under the motor is used to strengthen the motor mount, to eliminate vibration and to transmit the compression load.

2. Ingredient hoppers

Two ingredient hoppers, which probably can best be seen in FIGURES 2 and 3 are provided. They are a dough or enrobing hopper 20 and a filling hopper 21. The dough or enrobing hopper 20 is located at the left-hand side of the machine when facing the machine and is designed to receive the dough or enrobing product used to make the various bakery or portion controlled food products. The dough or enrobing product is simply inserted in the hopper from whence it is drawn into the filling rolls and piston as will be explained later. The dough or enrobing hopper 20 includes four side walls, 20a, 20b, 20c and 20d. The walls are angularly disposed with respect to each other and the wall 20d is substantially shorter than its opposite member 20b for ease in loading. The hopper is a unitary unit open at the bottom 20e and is held in place on the top of the roll housing 22 by means of a pair of brackets 23 which are bolted or welded at 25 to the roll housing.

The filling hopper 21 is substantially smaller than the dough or enrobing hopper 20. It also comprises four walls, 21a, 21b, 21c and 21d, and has an opening 21e in the bottom thereof. The filling hopper is designed to accept filling materials of various consistencies to be used in the production of any bakery goods and portion controlled food products. For example, jelly, meat for a meat pie, pie ingredients, such as blueberries and strawberries can be used. The hopper 21 is mounted on the auger housing 26 by means of a pair of swing hooks 27 (FIGURE 9) which are mounted for rotation on the depending plate 28 by a bolt 29 and are designed to hook around a corresponding bolt 30 on the frame 24 for proper alignment and ease of removal. The filling hopper is a unitary unit and can easily be removed for cleaning purposes and the like.

3. Hopper rollers drive and operation

This section of the machine of this invention is probably best shown in FIGURES 1, 8, 12, 13, 18, 20 and 25.

The roll housing 22 (FIGURE 8) is mounted over the dough piston housing 31. It is supported at its back side by the piston drive housing cover 32 (FIGURE 1) and at its front end by the die housing 33. One side of the housing 22 is supported by a ledge 34 (FIGURE 18) which is bolted at 34a to the roller drive mounting 35. The housing 22 is held in place on the ledge by two pins 36 which are received in openings 37.

The housing is actually two parts, an upper portion 22a and a lower portion 22a' having downwardly projecting corners wherein openings 37 are formed. The housing is held together by means of locking bolts 38 which are swiveled at 39 in extending ledges 40. The bolts 38 have handle nuts 41 which may be screwed down in a conventional manner so as to impinge on second extending ledges 42 attached to the upper portion 22a.

Within the roller housing 22 there is mounted a pair of cylindrical rollers 43. The rollers are mounted by means of central axles 44 which are journaled for rotation in openings 22b (FIGURE 4) in the side of the housing 22. As can be quite plainly seen in FIGURE 12, the rollers rotate in the direction of the arrows A and have a corrugated surface 43a of hills and valleys. The rollers 43 are not actually in contact, but, due to their surface contour and the rotation, tend to move the dough or enrobing material 45 downwardly in the direction of the arrow B through an open 46 in the bottom contour portion 22c and lower housing portion 22d of the housing. The opening 46 in turn communicates with the dough piston cylinder 47. As can also be seen in FIGURES 8 and 12, a pair of bolts 48 extend upwardly into the housing serving to anchor the contour 23c of the housing in position. The portion 22c of the housing 22 is contoured to provide a channel of decreasing cross-sectional area to assist in forcing the dough through the opening 46 and to the prevent feedback and overmixing.

The size of the opening, the location of the contoured bottom portion 22c and the size of the rollers 43 are all correlated so that as the dough passes downward to the rollers, it is removed from the rollers by the bottom contour portion 22c and directed into the opening 46 without "reworking" the dough. This allows the use of a higher fat content dough, i.e., products in excess of 75% by weight fat. If dough of this nature were reworked, it would become greasy and would be very difficult to handle. However, since it is smoothly fed through the opening 46, this condition is not fostered.

Referring now to FIGURES 18 and 20, we see the drive mechanism for the dough or enrobing feed rollers 43 just described. The main drive shaft 18 which is journaled in support plate S has a sprocket gear 49 mounted thereon over which passes a chain belt 50. The chain belt in turn passes around another sprocket gear 51 which is mounted for rotation on a bracket 52 bolted at 53 to the underside of the table top 13. A crank 54 is mounted on a shaft 55 attached to the sprocket gear 51. The end of the crank includes an extending bolt 56 which is slidably mounted in an opening 57a in the drive arm 57. Rotation of the sprocket gear 51 will thus cause the drive arm 57 to move in a reciprocating manner with a predetermined dwell time in relation to the auger speed to be described later. At the other end of the drive arm 57 a pawl plate 59 is attached by a pivoted joint 58. The pawl plate 59 mounts a drive pawl 60.

The roller drive support 35 (FIGURE 20) includes four upstanding stanchions 35a which are separated from each other and supported by means of braces 61. The stanchions 35a support a pair of shafts 62 on which are mounted two meshing gears 63 and 64. A ratchet gear 63b is mounted on the same shaft with and joined to the gear 63. The pawl plate 59 is attached for rotation to the shaft 62 of the gear 63 and is so located that the spring urged pawl contacts the exposed teeth 63c of the gear ratchet 63b. Thus on motion of the drive arm 57, the pawl plate will move up and down and on the downward stroke, the pawl will engage the teeth 63c thereby driving the gear 63 and in turn the gear 64. The shafts 62 are connected through male-female joints (not shown) to the dough or enrobing feed rolls 43 thus imparting motion to the rollers to feed dough or enrobing material to the dough or enrobing piston.

The amount of rotation of the gears 63 and 64 and thereby the rollers 43 is controlled by a cam plate 65 which is moved through a control arm 66. The cam plate 65 operates to blank out a portion of the ratchet teeth 63c on the gear 63b thereby shortening or lengthening the amount of rotation of the rollers. The cam control 66 is connected to the cam through a plate 66a which is slotted to receive a sliding bolt 67. Reference to FIGURE 2 will show that the control 66 slides in a slot 68 in the top of the filling piston drive housing 69. Motion of the control 66 in the direction of the arrow C (FIGURE 18) will decrease the amount of dough or enrobing material forced into the filling piston. The operation of the cam plate 65 is similar to the operation of the cam plate 115 more fully described hereafter under the section entitled "Dough or Enrobing Piston Drive and Controls."

4. Filling hopper drive and control

FIGURES 2, 7, 9, 11 and 39 best show the filling hopper drive and controls. Referring first to FIGURE 11, it can be seen that in the auger housing 26 is mounted for rotation an auger 70. The outward end of the auger is mounted in a thrust cup 26a which is threadedly received at 26b on the housing 26. The thrust cup takes up the thrust of the auger and acts as a bearing. The other end of the auger is connected through a male-female joint 70b to a drive shaft 71. The auger 70 connects with the filling hopper 21 through the opening 21e and thereby can take the contents of the filling hopper 21 to direct them through the opening 26a' and to the filling pipe 72 as will be described presently.

Figure 9:
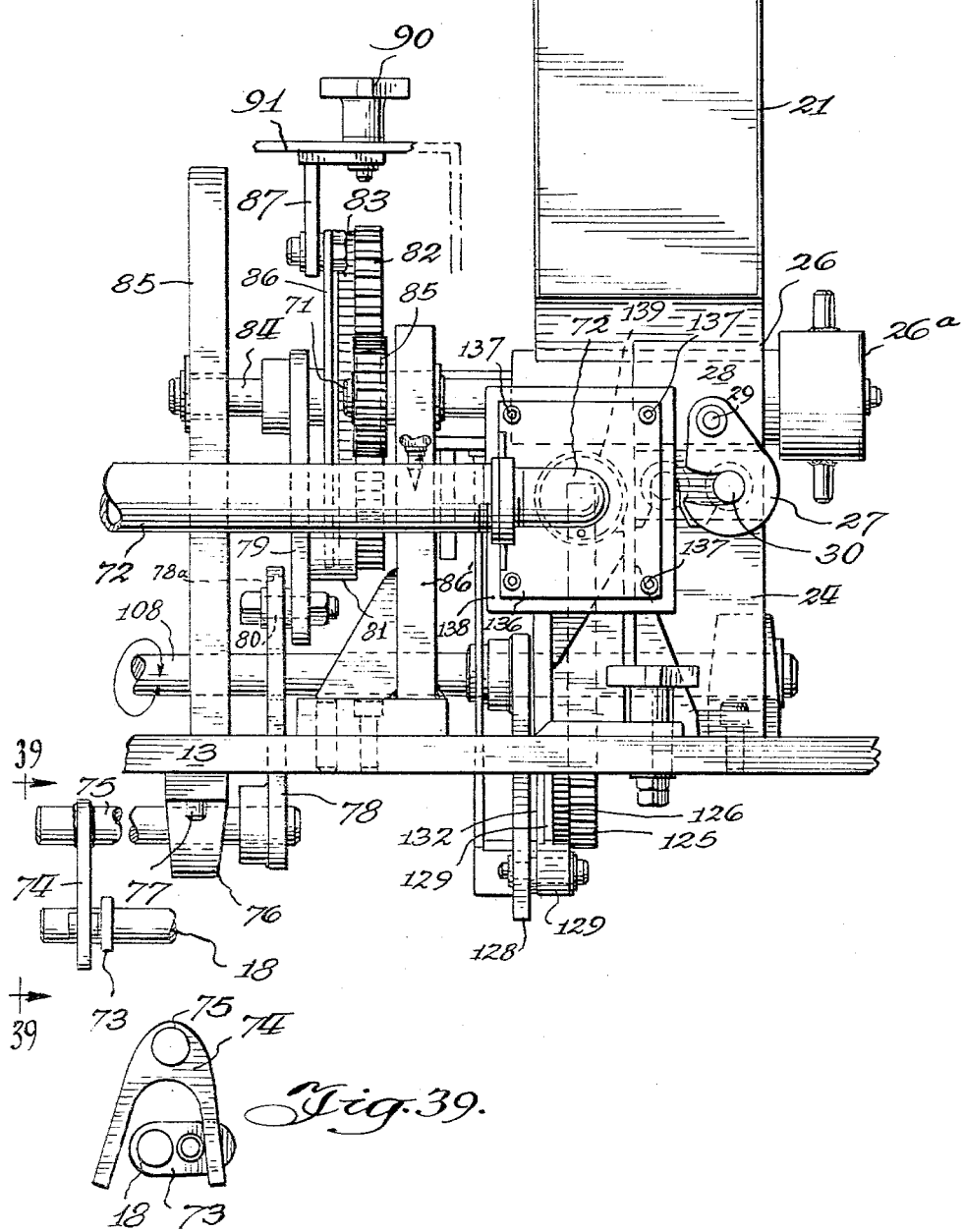
FIGURE 9 is an enlarged partial sectional view taken substantially along the line 9—9 of FIGURE 2 and showing some interior construction in phantom lines.

Referring to FIGURES 9 and 39, the drive for the auger 70 comes from the main shaft 18 which has an eccentric cam 73 thereon. The cam rides around in a forked member 74 which is attached to the shaft 75. Forked member 74 is in part an open cam follower and is used to obtain fixed cycle timing. The shaft 75 is journaled for rotation in the bearing 76 which is bolted at 77 to the table top 13. A drive arm 78 (FIGURES 7, 9 and 11) is rigidly attached to the other end of the shaft 75 and at its other end it is connected to a drive pawl plate 79. The connection between the drive pawl plate 79 and the drive arm 78 is made by a slotted opening 78a and a pin 80 mounted on the drive pawl plate. The other end of the drive pawl plate is journalled for rotation on the shaft 84 which is mounted in the stanchions 85 and 86'.

Also mounted on the drive pawl plate 79 is a pawl 81. The pawl 81 is spring-loaded by leaf spring 81a in an upward direction. Additionally mounted on the shaft 84 are a gear 82 and a ratchet gear 83. These two gears are actually joined together; however, the gear 82 is behind the gear 83 as shown in FIGURE 7. The gears are so located that the pawl 81 comes into driving contact with the teeth of the ratchet gear 83. Yet another gear 85 which is mounted on the shaft 71 is in driving contact with the gear 82. The shaft 71 is the drive shaft for the auger 70 and thus connection is made between the main shaft 18 and the auger 70.

In order to control the amount of filling delivered by the auger 70, a control cam plate 86 covers a portion of the gear 83. The area of the gear 83 which is covered is controlled by the control arm 87 which is connected by a pin 88 and a slotted opening 89 to the cam plate arm 86a. A control knob 90 is connected to the control arm 87 and is adapted to lock the arm in a specific position in a cover member 91. Thus, motion of the control arm 87 in the direction of the arrow D moves the cam plate 86 in the direction of the arrow E (see FIGURE 7) thus covering up more of the teeth on the gear 83 thereby shortening the drive stroke to the gear 85 and thus shortening the rotation of the auger 70. This has the effect of delivering less of the filling mixture to the filling pipe 72.

5. Dough or enrobing piston drive and controls

FIGURES 4, 8 and 21–23 show the dough piston drive and control mentioned in Section 2 with regard to the filling hoppers. Dough or enrobing material is moved downwardly from the rolls 43 through the opening 46 and into the dough piston cylinder 47. It must be cut and moved from the dough piston cylinder 47 out through the discharge 93 which will be described in more detail later. In order to do this, a dough piston 94 is provided in the piston cylinder 47. The dough piston is designed to cut the dough or enrobing material and push it in the direction of the arrow F. The piston 94 is provided with a piston ring 95. The dough piston 94 is connected to a rack 96 which in turn is driven by a gear 97. A connection between the piston 94 and the rack 96 is by conventional means 98. The rack 96 is carried by the channel 99 for sliding motion.

Figure 8:
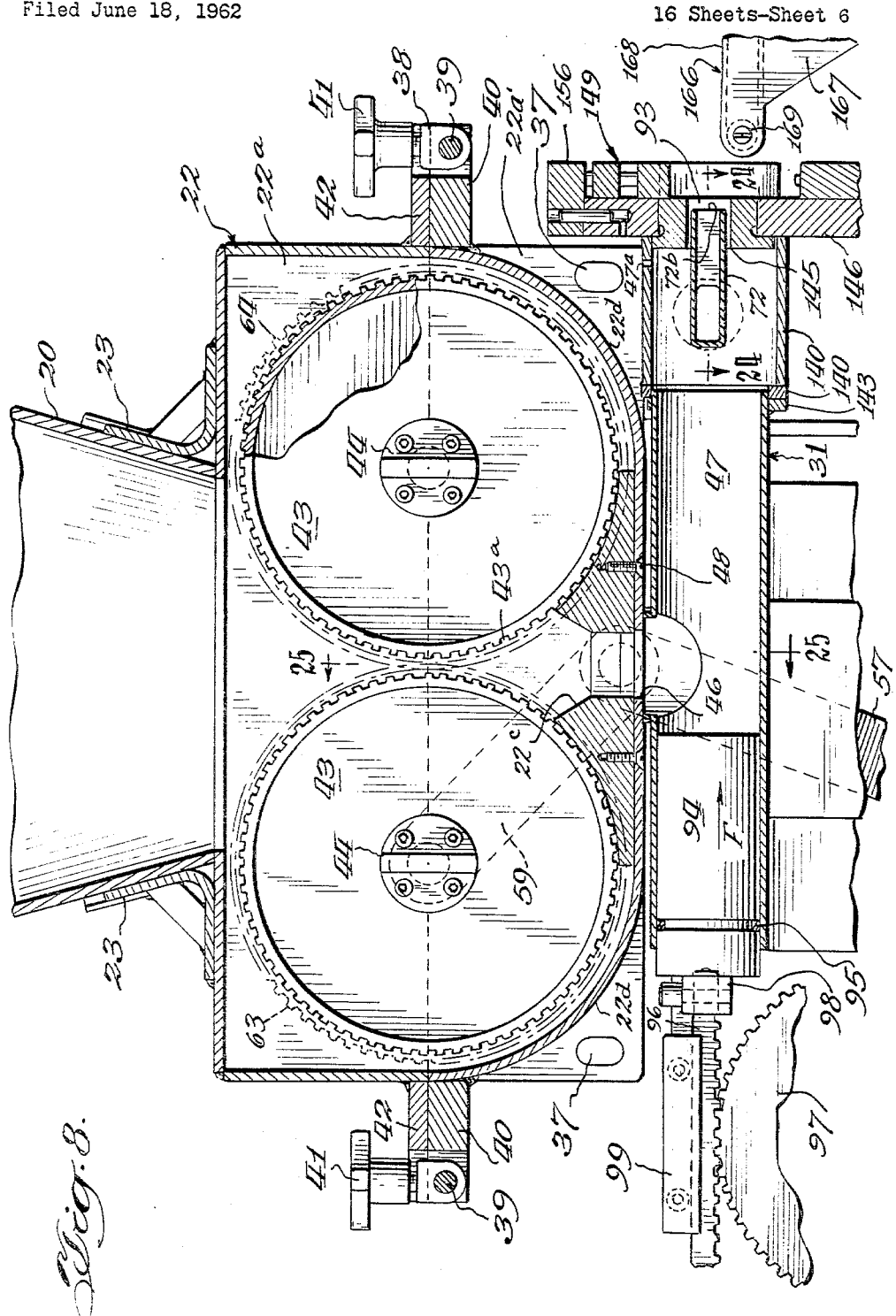
FIGURE 8 is an enlarged partial sectional view partly broken away taken substantially along the line 8—8 of FIGURE 2 showing some portions in dotted lines.

The dough or enrobing material piston housing 31 which includes the dough or enrobing material piston cylinder 47 for the dough or enrobing material piston 94 is supported on the table top 13 by means of an outwardly extending portion 100 which is bolted at 101 to the table top. An air escape opening 47a is provided near the end of an extension 140 of the cylinder 47 (FIGURE 8).

The drive for the dough or enrobing material piston 94 comes from the main shaft 18 which has mounted thereon for rotation an arm 102 connected on its outer end by means of a pin 103 to a drive arm 104. At the opposite end of the drive arm 104 is a slotted opening 105 which carries a pin 106 mounted on a pawl plate 107. The other end of the pawl plate 107 is mounted for rotation on the shaft 108. Keyed at 109 to the shaft 108 are two gears, the first being the ratchet gear 110 and the second being the drive gear 97. Mounted on the pawl plate 107 is a pawl 111 which is urged by spring 113 in the direction of the ratchet 110 so as to contact its teeth. Plate 107 and pawl 111 constitute a drive arm. Thus a driving motion to the ratchet gear 110 may be imparted through motion of the pawl plate 107.

Permanently mounted on the ratchet gear 110 is a return pin 112 (FIGURES 21–23). This pin has a very important function in the construction of the device of this invention and will be explained thoroughly presently.

It is of substantial importance in the production of bakery goods and portion controlled food products to determine the texture, density and amount of dough or enrobing material used. The piston drive of this invention is designed to provide such control. Thus, it is important to determine the exact stroke of the dough piston 94. Since the rate of extrusion is not always in direct ratio to the speed of the machine, forward motion in each cycle must be controlled. In order to do this, a dough piston control generally designated 114 (FIG. 27) is used. The control includes a cam plate 115 which is slotted at 116 to admit the pin 112. This cam plate is also carried by the shaft 108 and is designed to rotate about it. An outwardly extending arm 115a of this cam plate is connected by means of a pin 117 through a slotted opening 118 to a control arm 119. A control knob 120 is threadedly fitted to the arm 119 so as to allow it to be locked in place. The control arm 119 passes through a slotted opening in the piston drive housing cover 32 and is adapted to slide toward the front and the rear of the machine. Movement of the control arm 119 causes motion of the cam plate 115 which will block off additional teeth in the ratchet gear 110. Motion of the control arm in the direction of the arrow G (FIGURE 4) will decrease only the forward stroke of the piston 94 however.

Attention is now directed to the positions of the drive mechanism shown in FIGURES 4 and 21–23. As can be seen in FIGURE 4, the piston 94 is in a fully back position and the drive mechanism or the drive arm 104 is just about to begin a new stroke. The arm 102 obviously must rotate through a circle of 360°. In such a rotation from the position as shown in FIGURE 4, the drive arm moves a total of 84° in a back dwell during which time the piston remains fully withdrawn and the rolls 43 are turning. During this 84° movement, the pin 106 slides upwardly in the slot 105 until the bottom 105a of slot 105 abuts the pin and begins to drive the pawl arm 107. The drive segment of the rotation of the drive arm 104 is 97° during which time the pawl arm 107 will be moved through a segment of 76° as shown in FIGURE 21. This is a constant motion; the arm 107 always moves 76°. Upon reaching the end of the drive stroke, the drive arm 104 starts its backward stroke during which time the slotted opening 105 again slides on the pin 106 until the bottom 105b of slot 105 abuts the pin 106. The drive rotates through a 64° arc during this back dwell. At this point, the drive arm begins to move the pawl plate 107 in a rearward direction which takes up a 115° arc on the drive arm, thus bringing the arm back to its beginning position.

As mentioned, the pin 112 is important. Reference is had to FIGURE 22 wherein it can be seen that the pin 112 moves a maximum amount of 66°. By maximum amount is meant when the cam plate 115 is positioned to allow maximum rotation of the ratchet gear 110, the pin will arcuately move 66°. This would be full stroke on the piston 94. If the cam plate 115 is moved in a downward direction by a motion of the control arm 119 in the direction of the arrow G, the cam will blank additional teeth on the gear 110 thereby shortening the available forward stroke of the gear and the arcuate motion of the pin 112. In any event, on the back stroke of the pawl arm 107 it will engage the pin 112 in whatever forward position it may be, and will move it arcuately back to position shown in FIGURES 21 and 4. This has the result of bringing the piston back to its beginning position or bottom and the further result that bottom position of the piston 94 is always the same. It is in this position that the dough or enrobing material is injected through opening 92 of the cylinder.

Once again in FIGURES 4 and 21–23, it can be seen that in FIGURE 4 the piston is at the bottom. In FIGURE 21 the pawl is just beginning to move into contact with the teeth. It can be seen that there is a slight difference in the location of the cam plate 115 as shown in these views. In FIGURE 22, the pawl plate 107 has moved its maximum distance and has driven the piston as far forward as possible, bringing the pin through an arc of 66°. In FIGURE 23, the pawl plate is beginning to move in the opposite direction to pick up the pin 112 and move the piston in the opposite direction, thus bringing the piston back to bottom.

This construction greatly affects the consistency and density of the dough. The dwells or pauses at the end of the front and back stroke allow for the dough to expand and recover, and also permit the discharge of air in the dough piston cylinder 47. This is particularly important at the back stroke because it allows the extrusion to expand as it passes out through the opening 93 and permits the cylinder to receive more dough at opening 92. The bottoming of the piston at the same position in each case is also very important since it provides very accurate control of the amount of dough which is used in any particular bakery goods or portion controlled food products. Further, the ability to control the amount of dough is also very important since the dough qualities and specific gravities will vary as the direct results depending upon the type of bakery goods or portion controlled food products desired affect size and thickness. Moreover, the air opening 47a allows escape of any excess air as the dough is fed to the die thus preventing expansion of the product. If the air could not escape, it would be held in the dough and thus expand the product.

In connection with the explanation of the filling piston drive and control, it should be pointed out now that the principle just above explained is substantially the same so that the description will be somewhat shorter.

6. Filling piston drive and controls

The filling piston drive and controls are probably best shown in FIGURES 7 and 16. Referring first to FIGURE 16, it can be seen that the mechanism is quite similar to that of the dough piston. Thus, a piston 121 is provided in a cylinder 122, the piston being connected to a rack 123 mounted for sliding on a channel 124. The cylinder 122 connects with the filling pipe 72 and also has an opening in it, 122a, which connects with the auger cylinder 26 so that material moved from the filling hopper 21 through the auger cylinder 26 by the auger 70 is deposited in the cylinder 122. The filling piping will be described in yet another section.

Referring now to the drive for the piston 121, it should first be explained that the drive gear 125 and the ratchet gear 126 are mounted on the same shaft 108 as the drive mechanism for the dough or enrobing piston. Also mounted on the shaft at 108 and keyed at 127 thereto is another pawl arm 128 carrying a pawl 129 spring-loaded at 129a in the direction of the gear 126. The gears 125 and 126 are designed to be freely rotatable on the shaft 108. However, the pawl arm 128 is firmly attached thereto so that the pawl arm 128 will swing through exactly the same arc, i.e., 76° as the pawl arm 107 in the dough or enrobing filling mechanism. This means that the maximum throw of the piston 121 is the same as the maximum throw of the piston 94.

However, since the filling material is designed to be placed within a bakery product or portion controlled food product or on the top of it, it is obvious that the piston 121 must start after the piston 94 and must finish before it, and also must return to zero or its full bottom position. In order to accomplish this, a pair of cam plates is provided. The first of these plates is a cam 129 which is quite similar to the cam 115 for the dough piston. The cam has a slot 130 designed to receive a pin 131 which performs the same function as the pin 112, i.e., that of bringing the piston 121 back to zero. Additionally, a second cam plate 132 is provided which also blanks out a portion of the ratchet gear 126. Both of these cam plates are attached by means of arms 129a and 132a to control arms 133 and 134 which perform the same function as the control arm 119 with respect to the dough or enrobing filling piston, with the exception that they are designed to move two cam plates. In operation, the two cam plates may be set so that the pawl 129 does not contact the teeth on the gear 126 until after the dough piston 94 has started to move forward and so that the pawl 129 is forced off or disconnected from the teeth and thus out of drive connection before the end of the stroke of the piston 94. In any event, however, the piston 121 will be brought back to zero at the same time as the piston 94 due to the location of the pin 131 and the fact that the pawl arm 128 swings to the same arc as the pawl arm 107 on the dough filling piston, thereby ensuring proper placement of filling within the product.

7. Filling piping and air by-pass and relief

Figure 24:
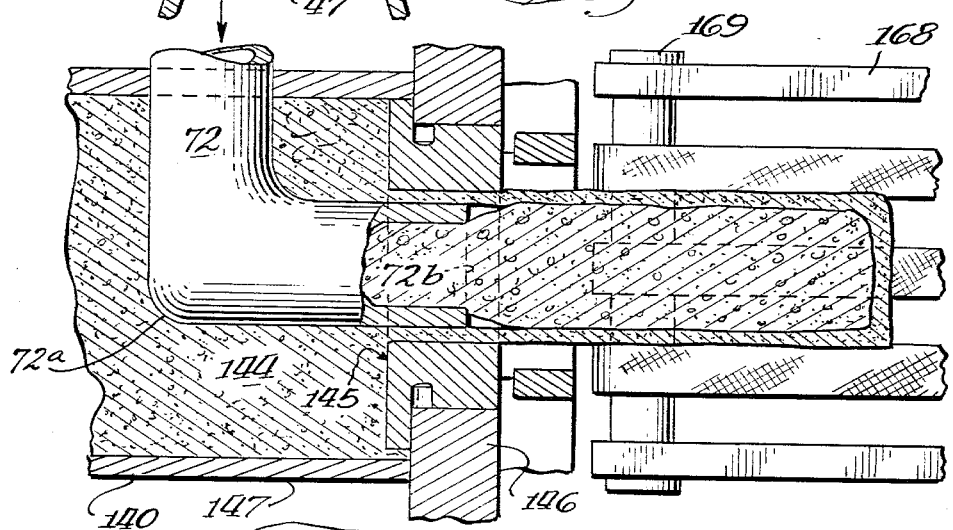
FIGURE 24 is an enlarged partial sectional view taken substantially along the line 24—24 of FIGURE 8.

The filling piping is perhaps best shown in FIGURES 9, 17 and 24. As the filling material is forced forward by the piston 121, it enters the piping 72. The piping 72 is connected by means of a flange 136 which is bolted at 137 to a flange 138 on the end of the cylinder 122. A calibrated opening 139 is provided in the top of the cylinder 122 to allow air forced forward by the piston 121 to escape, thereby eliminating air binding of the system to remove air bubbles from the compressed filling and to permit air-free products.

Once in the piping 72, the filling material passes across the front of the machine as perhaps is best shown in dotted lines in FIGURE 2. If the broken pipes shown in FIGURES 9 and 24 were assembled together, a satisfactory idea of the operation will result.

The filling material thus moves through this connected pipe, the end of which is located in the extension 140 of the dough filling cylinder 47. The extension 140 also has a flange 141 which is bolted at 142 to a flange 143 attached to the end of the cylinder 47. It is through this cylinder and the extension that the dough passes. As can be seen in FIGURE 24, wherein the dough is shown as 144, the piping 72 has a bend 72a and an opening 72b, the opening being in the direction of flow of the dough. The opening further is located substantially within the extrusion opening 145 which will be described later. The result of this construction is that the filling may be placed either within the dough to make a filled piece of bakery goods or portion controlled food products or on top of it to make a pile-like arrangement, all of which will be described later.

8. Cutting and sealing mechanism

In the description of the cutting and sealing mechanism reference is had to FIGURES 3, 10, 14 and 15 which probably best show the necessary features of the construction. However, since the extrusion opening is also to be considered in this section, FIGURES 4, 10 and 24 must also be considered.

In interest of clarity, the extrusion opening will be described first. As mentioned in the previous section, an extension 140 is attached to the end of the dough cylinder 47. This extension includes an extrusion die 145 having an orifice or discharge opening 93 disposed at its outer wall 146. The extrusion die is of conventional construction as is well known in the extrusion art, and numerous dies can be substituted in the opening to provide the desired shapes, such as those shown in FIGURES 29–36 which will be described in greater detail later in this specification. Suffice it therefore to say that an extrusion die numbered 145 is provided in the outer wall 146 of the extension 140, which die functions to shape the extruded dough into the desired bakery goods. Additionally, the extension 140 is provided with a removable wall 147 which is held in place by the knob 148, the wall being removable for cleaning purposes.

As the dough passes from the extruder 145, and is shaped into the desired bakery goods, it must be cut and sealed into the individual controlled pieces. In order to do this, a cutting and sealing mechanism is provided. The cutting and sealing mechanism 149 can probably best be seen in FIGURE 3 for a general view. Thus, the mechanism is designed to close down on the dough as it issues forth from the extruder 145 thereby cutting and sealing it into the desired lengths.

FIGURE 14 probably shows the cutters themselves most clearly. In that figure it can be seen that the cutters comprise two blades generally numbered 150 and 151, one spring mounted. The blades are complementary in shape in that the center section 150a of the lower blade is in the form of a tongue which fits into and is operative with the U-shaped center section of the upper blade 151. When the center section 150a of the lower blade comes in contact with the center portion 151a of the upper blade, they will meet, cut, and seal the dough. Although the upper blade 151 is positively actuated, as subsequently described, springs 151s are provided to urge the blade 151 upward. The springs simply facilitate smoother blade operation and can be mounted on the frame above the blade 151 and connected thereto to urge the blade upward. As can be seen in FIGURE 15, which is a section through the upper cutter along section line 15—15 of FIGURE 14 adjacent its center section 151a, the upper cutter is a grooved member which tends to crimp off the dough under pressure from the lower cutter 150 in much the same way as the edge, for example, of a pie dough was crimped with a fork by the maker in prior times. More particularly, cutter 151a is provided with a plurality of ridges 151a' which form grooves 151a'' therebetween to effect a crimped pattern about the edge of the cut dough.

The lower cutter 150 is designed to move up and down on a pair of pins 152 which are journaled in openings 153 in the lower cutter 150. The upper cutter 151 is also mounted on a pair of pins 154 which are journaled in the openings 155. The pins tend to maintain the cutter blades in their proper location in their up-and-down motion.

Each of the cutters is provided with gear racks as at 151b in the upper cutter and 150a' in the lower cutter. These racks ride on gears 156 which are mounted for rotation on the front of the member 140. This gear mechanism tends to time the cutters properly and allows the upper cutter to be driven from the lower cutter. The pins 152 are mounted on the table top 13 and the pins 154 are suspended from an extension 156 secured to the upper edge of outer wall 146 of the extension box 140.

Depending upon the type of product to be cut, it may be important to have the upper or lower jaw impact or reach the product at the same time or different times. For example, in certain pies, where the seal is to be near the bottom face of the pie, if the upper cutter impacted at the same time as the lower cutter, the dough would be torn near the upper edge. Thus for this reason in such a condition it would be important to have the lower cutter impact first. The variations in cutter impact may easily be made by varying the connection between the racks 151b and 150a with the gears 156. By changing the initial location of the racks on the gears a tooth or two in either direction it is possible to adjust the contact point of the cutters.

The lower cutter 150 is driven by means of a driver 157 which is bolted at 158 to extending bar 159 on the front of the lower cutter. The other end of the bar 157 (FIGURE 10) is connected by means of a pin 160 and yet another drive bar 161 which is pinned 162 at its other end to a leg 12 on the frame. The bar 161 is designed to move through an arc on the pin 162 and is also designed to allow some motion at 160 and at the bolt 158.

Figure 10:
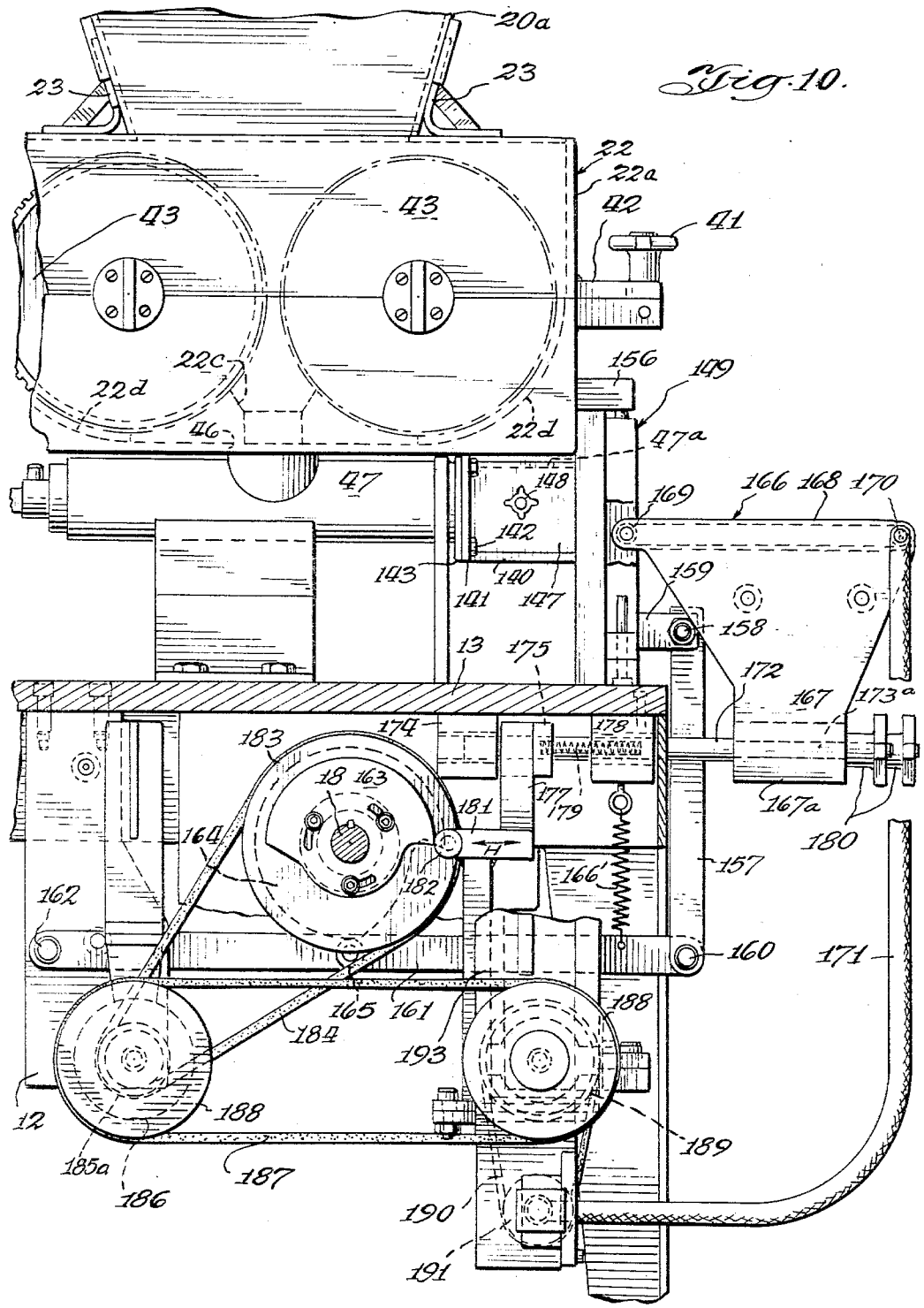
FIGURE 10 is an enlarged partial sectional view taken substantially along the line 10—10 of FIGURE 2 showing certain portions in dotted lines.
Figure 25:
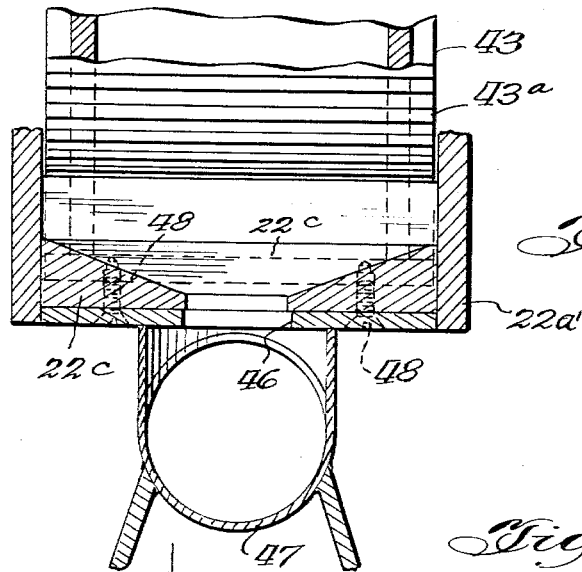
FIGURE 25 is a partial sectional view taken substantially along the line 25—25 of FIGURE 8.

Mounted on the main motor shaft 18 are a pair of cams, i.e., cam 163 and the one behind it shown in dotted lines in FIGURE 10, cam 163. The cam 163 will be discussed in the next section. The cam 164 contacts a roller 165 on the bar 161 and forces it down. The bar is normally spring-loaded at 166' to an up position. In other words, the cutters are normally closed. However, the throw of the cam forces the cutters open and thereby allows the dough to flow through and allows them to shut them only in proper time depending upon the location and construction of the cam 164.

In place of the cutting mechanism described as at 151a when sealing is not required, numerous substitutions may be made, such as wires, knife blades and the like, all of which will be apparent to those skilled in the production of bakery goods, it being only necessary to provide the proper kind of cutter for the type of goods being produced.

9. Conveyor system

As to the conveyor system, the necessary elements may best be seen in FIGURES 5, 6, 10, 24 and 26. First in FIGURE 10, the conveyor numbered generally 166 may clearly be seen. As the bakery goods or portion controlled food products pass through the extrusion die 145 and are cut by the cutting mechanism 149, a conveyor or the like should be provided to immediately transfer the bakery or food products to the next operation and to stretch or fold the dough to obtain a smooth and even finish and to prevent cutting of the product with filling at the ends. Additionally, the conveyor should be capable of moving in an in-and-out direction so that it can move within the cutting and sealing jaws 151a and 151b to take the beginning portion of the issuing bakery goods and then move out of the cutting jaws to allow cutting and sealing. This is true because of the consistency of the goods and the rate of extrusion.

The conveyor should be described first. As can be seen in FIGURE 10, it consists of a base member 167 which has at its top a conveyor belt 168 mounted on two rollers 169 and 170 with the drive roller 170 being driven by means of a conventional variable speed drive through the flexible shaft 171. The flexible shaft is stopped and started by a conventional cam and friction clutch (not shown). The conveyor is mounted on a pair of slidable rods 172 and 173 shown in FIGURE 6. The rods 172 and 173 are slidably mounted in a block 174 attached to the underside of the table top 13. The rods also pass through a member 175 which is pinned to both rods at 176. This member is attached to a drive arm 177 to be described presently. The slidable rods also pass through a bearing-like member 178 also attached to the table top 13. Placed between the bearing member 178 and the member 175 is a spring 179 designed to take up some of the shock due to the motion of the conveyor member. At the outward end, the rods pass through the lower portion of the base member at 167a where they are reduced in diameter as at 173a so as to fit the smaller openings 167b. Knobbed nuts 180 are disposed at the end of each of the rods to hold the conveyor tightly in place on the reduced portions 173a.

The drive mechanism for the slidable rods as already mentioned, includes a drive arm 177 which is attached to a cross head 181 (FIGURE 10). At the other end of the cross head is a roller 182 which rides on the cam 163 previously mentioned. The cam is so shaped that as it rotates, it will force the cross head to move in the direction of the arrow H. Thus, on outward motion, it will push the conveyor mechanism away from the cutting arms and on an inward motion, will allow the conveyor to move toward the cutting arms, the conveyor being spring-loaded (not shown) to an inward position.

The conveyor is driven, as mentioned, through a Reeves type variable speed drive shown generally as V and through the power cable 171. The variable speed drive takes its drive from a pulley 183 mounted on the motor shaft 18 around which passes a timing belt 184. The timing belt passes around a first pulley 185a which is integral with a clutch 185b which is coaxial and in driving contact with a pulley 186 around which passes a variable speed drive belt 187. The variable speed drive belt passes around split V pulley 188 which in turn drives an inner pulley 189 around which passes another belt 190. Suffice it to say that the diameter of pulley 188 may be varied. The pulley 188 is in the form of a split V pulley and by turning knob v' the split halves of the pulley can be moved toward and away from each other changing the diameter of the belt contacting surface of the pulley, therefore changing its rotational speed. The stationary knob is connected to a shaft v'' which is threaded into the extension structure v''' of the left hand half (FIG. 5) of the split pulley, so that manual rotation of the knob v' will cause the movable left half of the pulley to move toward and away from the stationary right half of the split pulley 188. The belt 190 passes around a drive pulley 191 which is connected in a conventional manner to the drive shaft 171. Thus due to the construction of the variable speed drive system, the rotational speed of the conveyor member may be controlled. The drive shaft at 171 is mounted in a bearing 192 which is carried by the table extension 193. The conveyor speed is related to the extrusion speed of food products to prevent tearing and breakage.

10. Operation

The filling hopper 20 is first filled with dough. The type of dough and the consistency thereof will, of course, depend upon the desired end product. However, suffice it to say that a wide variety of pastry dough, pizza dough, bread dough, and the like, may be used. Assuming the bakery or portion controlled food commodity to be produced will include a filler either within the product or on top of it, the filling hopper is then filled with the desired filler. If, on the other hand, the product is not to be filled, for example, if cookies are to be made, the filler will be left empty and, in, fact, the filling tube 72 may be removed from the extension 140. Such removal may be desirable depending again on the type of goods to be produced but at any rate, suffice it to say that the tube can be removed and the opening in the side of the extension 140 closed by means of a closure plate (not shown).

Again, depending upon the type of bakery confection to be prepared, a die 145 is chosen to give the desired shape. In order that the type of die which is usable in the bakery machine of this invention be understood, attention is now directed to FIGURES 29–36 which show a group of bakery goods and portion controlled food products producible in the device of this invention. For example, in FIGURE 29 is shown a type of pie consisting of an outer dough 190 and an inner filling 191 which is shown in the sectional view of FIGURE 30. FIGURE 31 shows a type of cooky having a filling material of some type disposed thereon. FIGURE 32 shows yet another kind of confection with a filling material on the top thereof as do FIGURES 33 and 34. FIGURE 35 shows a sandwich-like construction which consists of upper and lower dough portions 192 with a filling 193 disposed therebetween. FIGURE 36 shows the type of cooky without any filling at all.

The machine is now ready for operational adjustment. As should be apparent from the description of the device, all of the driving motions are taken from the main drive shaft 18 on the main motor 16. Thus, all of the moving parts of the machine may be properly timed for operation to obtain the desired pastries and portion controlled food products. The first adjustment is that of determining the stroke of the dough piston 94 which controls the amount of dough 70, the rate at which it will be ejected through the die 146, and the density of the dough. As explained, this piston is controlled by the control 114 which is then set at the proper position. The dough piston 94, of course, operates in cooperation with the rollers 43. As explained, the rotation of the rollers 43 may also be controlled by means of the control 66 (FIGURE 18) so as to determine how much dough is forced down from the rollers into the dough piston chamber 47. Quite obviously, once the amount of dough forced into the chamber 47 is determined, and the stroke of the piston is determined, both the amount of dough used in the final product and the consistency of the product is also determined, both of these being important features.

Now assuming that the machine is going to produce a filled pastry such as a small pie, with the filling completely surrounded by the dough, the filling mechanism must also be adjusted. This is done by means of the controls 133 and 134 (FIGURE 16) which determine the stroke of the filling piston 121. The controls 133 and 134 set the cam plates 129 and 132 respectively to block out a portion of the teeth on the gear 126 so that the pawl is disconnected from the teeth at those portions to determine the piston stroke. Thus, the piston 121 is adjusted in this case so that it begins its stroke after the dough piston 94 and completes its stroke before the dough piston 94 reaches its outermost position. At the same time, the amount of filling moved from the filling hopper 21 by the auger 70 into the filling pipe 72 must be determined. This adjustment is made by means of the control 87 (FIGURE 7) which determines the rotation of the auger 70.

Other adjustments may also be made in order that the machine operates properly. For example, a substitution may be made in the cam 164 which controls the drive to the cutting mechanism 149 thereby shortening or lengthening the time between cutting strokes. This will determine the length of any particular confection. Furthermore, the cam 163 may be changed so that the conveyor mechanism 166 moves in and out in proper time and speed with respect to the cutting mechanism 149 to receive the pastry. Additionally, the speed of the conveyor mechanism 166 may be adjusted by means of adjusting the tension on the variable speed drive by turning knob v' to move the split halves of the pulley of the variable speed drive toward and away from each other to change the diameter of the pulley.

The device is now ready for operation. It will be noted that the machine will produce and carry away fully completed pastry products such as those described. These products may be frozen and later cooked, or may be handled in any other conventional manner with satisfactory results.

In FIGURES 37 and 38 are shown in semi-diagrammatic form alternate uses for the bakery machine of this invention. For example, in FIGURE 37 it will be noted that conveyor 194 is of conventional construction and is located so that its belt 195 passes under the outlet 92 in the filling roll section 22. The outlet 92 is best seen in FIGURE 4 of the standard machine. Thus ingredients can be forced directly from the machine on the conveyor. For example, mashed potatoes could be so ejected. In such an operation the piston cylinder 47 is removed and the filling piston 94 is operated to scrape off, terminate or cut the ingredient as it issues from the opening. As shown in this view, the conveyor moves in the direction of the arrow X and the filling piston reciprocates as shown by the arrow Y. As the conveyor passes along the ingredients disposed thereon may be mixed with another ingredient such as gravy, meat broth, etc., by means of the filling pipe 72 which now is provided with a horizontal outwardly extending elbow extension having a downwardly extending elbow portion 198 disposed on the end thereof.

This type of arrangement with the bakery machine of this invention may be simply done since all the parts of the machine are removable and the machine may be re-assembled with certain parts. Such a device would produce, for example, additional types of bakery confections or other foods.

In FIGURE 38 is shown a construction whereby an entire meal may be disposed on a plate. Plates 196 are carried on a conveyor belt 197 which passes along the front of the machine. In this case food is ejected from the die 145 and is cut off by the cutting mechanism 149. Yet another fitting 198' is disposed on the end of the filling pipe 72 (not shown in this view). The fitting 198' is in the form of a simple downwardly extending elbow extension. Thus in this fashion potatoes or something of this nature may be deposited on the plate through the die 145 and then meat of some kind through the filling opening 198' to thereby provide and entire meal. As previously mentioned, FIGURES 29–36 show examples of the wide variety of bakery goods and portion controlled food products producible in the device of this invention. More specifically, FIGURES 29 and 30 show a type of pie with an inner filling 191' completely covered by an outer dough 190' (FIG. 30 being a section taken on line 30—30 of FIG. 29). The pie can be made with a die similar to that shown in FIGURES 24 and 26 by simply providing an oblong rather than a rectangular opening for the dough. The flattened portions of the dough shown at the ends of the pie in FIGURE 29 may be formed by eliminating the ridges 151a' of the cutter 151a shown in FIGURE 15.

Figure 26:
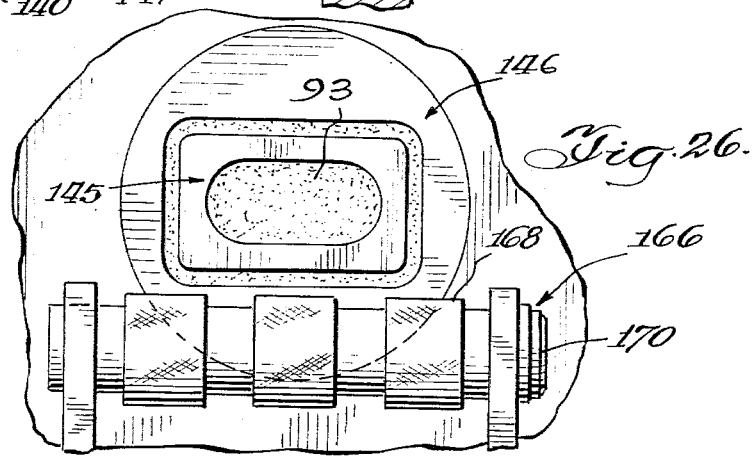
FIGURE 26 is an enlarged partial front elevational view showing the die opening and conveyor shown in FIGURE 3.

The square sandwich-like food product shown in FIGURE 35 having upper and lower dough portions 192' with a filling 193' disposed therebetween can be produced by the same arrangement as shown in FIGURES 24 and 26. The die would simply be provided with upper and lower horizontal slots through which dough may be extruded thus forming the upper and lower dough portions 192'. The filling 193' may be disposed therebetween in similar fashion as the filling 191' is disposed inside the dough in FIGURE 30. The same cutter blades 150 and 151 as shown in FIGURE 14 may be used to cut each sandwich-like bakery product.

FIGURE 31 and FIGURE 34 show types of cookies having a filling material of some type disposed thereon. These bakery products may be produced by using the structure as shown in FIGURE 37. The round and star shaped cookie portions can be extruded through dies which would be placed in the opening 92 in FIGURE 37. The filling material can be disposed thereon through fitting 198. Similarly, the cookie shown in FIGURE 36 without any filling at all may be produced by simply eliminating the second step of applying the filling material through fitting 198.

The product shown in FIGURE 32 can be produced by providing appropriate forming dies to produce dough portions 199 and 200 similar to the cookie in FIGURE 36. The two separate dough portions may be subsequently joined manually or by any appropriate mechanical means to form the food product as shown in FIGURE 32.

The type of cookie shown in FIGURE 33 may be produced by extruding the dough through a die 145 in FIGURE 38, the die having a slot in the form of the lower dough portion as shown in FIGURE 33. Each dough portion is then cut off and deposited on an appropriate conveyor as 197. The dough portion is then transferred below fitting 198' where the filling material is disposed thereon.

Through the device of this invention it has been determined that work may be performed in the production of bakery goods which in the past would have required the services of up to ten or twelve people by means of this machine with one attendant. Such an attendant need not be skilled at all in the production of such goods but only must keep the hoppers 20 and 21 filled. The products produced by the bakery machine of this invention are of the highest quality and are completely satisfactory to the public.

Having thus described my invention as related to the embodiments shown in the accompanying drawings, it is my intention that the invention be not limited by any of the details of description unless otherwise specified, but rather be construed broadly within its spirit and scope as set out in the accompanying claims.

I claim:

1. An automatic device of the character described adapted to produce various types of bakery goods and portion controlled food products; comprising: a frame; a form defining die on said frame for forming bakery dough and the like into desired shape as it passes therethrough; a piston cylinder mounted on said frame having its discharge opening connected to said die; a piston mounted in said piston cylinder for reciprocation therein and to pass a measured amount of said bakery dough through said die; a piston control apparatus mounted on said frame adjacent said piston cylinder, said control apparatus including a drive mechanism; said drive mechanism including a drive gear connected in driving contact with said piston, a drive arm attached to said drive gear adapted on motion in one direction to rotate said gear through a predetermined arc to thereby drive said piston forward, and a pin mounted on said drive gear in the path of said drive arm whereby on motion in the other direction of said drive arm, said pin will be contacted and moved to substantially the same position after each reciprocal stroke thereby locating said piston in substantially the same position after each stroke.

2. The device of claim 1 wherein said control apparatus includes a blanking cam mounted in cooperation with said drive gear and adapted to blank out a portion of said drive gear teeth whereby the forward stroke of said piston may be varied.

3. An automatic device of the character described adapted to produce various types of bakery goods and portion controlled food products; comprising: a frame; a form defining die on said frame adapted to form bakery dough and the like into desired shape as it passes therethrough; a piston cylinder mounted on said frame having its discharge opening connected to said die; a piston mounted in said piston cylinder and adapted to reciprocate therein and to pass an amount of said bakery dough through said die; a drive rack connected to the drive end of said piston; a piston control apparatus mounted on said frame adjacent said piston cylinder, said control apparatus including a drive mechanism; said drive mechanism including a pair of connected driving gears, one of said gears being disposed in driving contact with said piston rack, and a drive arm having a spring loaded pawl thereon located in driving connection with said other gear, said drive arm being adapted to rotate through an arc to drive said other gear through said spring loaded pawl, a pin mounted on said other gear in the path of said drive arm whereby on the reverse movement of said drive arm said pin will be contacted and moved to substantially the same position after each reciprocal stroke thereby bottoming said piston in the same position; and a blanking cam mounted over said other gear and adapted to blank out a portion of the gear teeth whereby on the stroke of said drive arm said spring loaded pawl will be unable to contact a predetermined portion of said other gear teeth thereby terminating the forward drive stroke of said piston and determining the length of said forward stroke.

4. An automatic device of the character described adapted to produce various types of bakery goods and portion controlled food products; comprising: a frame; a form defining die on said frame adapted to form bakery dough and the like into desired shape as it passes therethrough; means for passing an amount of said bakery dough through said die; a piston cylinder mounted on said frame having a discharge opening; filling piping connected to said piston cylinder adjacent said discharge opening and in communication therewith; a piston mounted in said piston cylinder and adapted to reciprocate therein and to pass a measured and predetermined amount of filling through said filling piping; a piston control apparatus mounted on said frame adjacent said piston cylinder, said control apparatus including a drive mechanism; said drive mechanism including a drive gear connected in driving contact with said piston and a drive arm attached to said drive gear adapted on motion in one direction to rotate said gear through a predetermined arc to thereby drive said piston forward; a pin mounted on said drive gear in the path of said drive arm whereby on motion in the other direction of said drive arm said pin will be contacted and moved to substantially the same position after each reciprocal stroke; and said filling piping being connected to said die whereby said filling may be applied to the dough passed through said die.

5. The device of claim 4 wherein said control apparatus includes a blanking cam mounted in cooperation with said drive gear and adapted to blank out a portion of the teeth of said drive gear whereby the stroke of said piston may be varied.

6. An automatic device of the character described adapted to produce various types of bakery goods and portion controlled food products; comprising: a frame; a form defining die on said frame for forming bakery dough and the like into desired shape as it passes therethrough; means for passing an amount of said bakery dough through said die; a piston cylinder mounted on said frame having its discharge connected to a filling piping; a piston mounted in said piston cylinder for reciprocation therein and to pass a measured and determined amount of filling into said filling piping; a drive rack connected to the drive end of said piston; a piston control apparatus mounted on said frame adjacent said piston cylinder, said control apparatus including a drive mechanism; said drive mechanism including a pair of connected driving gears, one of said gears being disposed in driving contact with said piston rack, a drive arm having a spring loaded pawl thereon located in driving connection with said other gear, said drive arm being adapted on motion in one direction to rotate through an arc to drive said other gear through said spring loaded pawl; a pin mounted on said other gear in the path of said drive arm whereby on movement in the other direction of said drive arm said pin will be contacted and moved to substantially the same position after each reciprocal stroke thereby locating said piston in the same position; and a pair of blanking cams mounted over said other gear and adapted to blank out a portion of said gear teeth whereby on the stroke of said drive arm said spring loaded pawl will be unable to contact a predetermined portion of said gear teeth thereby determining the beginning and end of the stroke of said piston.

7. An automatic device of the character described adapted to produce various types of bakery goods and portion controlled food products; comprising: a frame; a form defining die on said frame for forming bakery dough and the like into desired shape as it passes therethrough; piston means for passing an amount of said bakery dough through said die; a dough container mounted in delivery position on said piston means; a pair of rolls disposed in said container and means for intermittently rotating said rolls in the same direction for feeding a predetermined and measured amount of said dough to said piston means for passage through said die.

8. An automatic device of the character described adapted to produce various types of bakery goods and portion controlled food products; comprising: a frame; a form defining die on said frame for forming bakery dough and the like into desired shape as it passes therethrough; means for forcing an amount of said bakery dough through said die; a dough container mounted in delivery position on said first named means; and a pair of rolls mounted in said container, said rolls being rotatable in the same direction to move an amount of dough therethrough; control means for controlling the amount of rotation of said rolls whereby a predetermined and measured amount of said dough is periodically moved therethrough to said first named means for passage through said die.

9. An automatic device of the character described adapted to produce various types of bakery goods and portion controlled food products; comprising: a frame; a form defining die on said frame for forming bakery dough and the like into desired shape as it passes therethrough; means for forcing an amount of said bakery dough through said die; a dough container mounted in delivery position on said first named means; and a pair of rolls having corrugated surfaces mounted in said container, said rolls being rotatable in the same direction to move an amount of dough therethrough; control means for determining the amount of rotation of said rolls, said control means including a pair of gears in driving contact with each other and connected to said rolls, one of said gears being a driving gear and the other a driven gear and a drive arm associated with said driving gear having a spring loaded drive pawl connected thereto and adapted to drive said driving gear on movement of said drive arm.

10. The device of claim 9 wherein said driving gear comprises two connected gears, one in driving contact with said driven gear and the other in contact with said pawl in driving relation and a movable cam plate covering a portion of said last named gear and adapted to shield a predetermined amount of gear teeth on said other gear whereby the pawl is unable to contact certain of said teeth thereby decreasing the amount of rotation of said gears and said rolls.

11. An automatic device of the character described adapted to produce various types of bakery goods and portion controlled food products; comprising: a frame; a form defining die on said frame for forming bakery dough and the like into desired shape as it passes therethrough, means for passing an amount of said bakery dough through said die; means for applying filling material to said dough as it passes through said die; and a container mounted in delivery position on said filling means, said container having disposed thereunder a rotatable auger for moving filling material from said container to said filling means; and control means associated with said auger, said control means including drive means for said auger, said control means being for controlling said drive means and thereby said auger rotation whereby intermittent rotation occurs so that a predetermined and measured amount of said filling material may be supplied to said filling means.

12. An automatic device of the character described adapted to produce various types of bakery goods and portion controlled food products; comprising: a frame; a form defining die on said frame for forming bakery dough and the like into desired shape as it passes therethrough, means for passing an amount of said bakery dough through said die; means for applying filling material to said dough as it passes through said die; and a container mounted in delivery position on said filling means, said container having disposed thereunder a rotatable auger for moving filling material from said container to said filling means; and a drive control for said auger including a driving gear connected to said auger in driving connection for rotating same in a filling direction and means for varying the drive of said driving gear whereby intermittent rotation occurs so that a predetermined and measured amount of said filling material may be supplied to said filling means 13. An automatic device of the character described adapted to produce various types of bakery goods and portion controlled food products; comprising: a frame; a form defining die on said frame for forming bakery dough and the like into desired shape as it passes therethrough, means for passing an amount of said bakery dough through said die; means for applying filling material to said dough as it passes through said die; and a container mounted in delivery position on said filling means, said container having disposed thereunder a rotatable auger for moving filling material from said container to said filling means; a driving control for said auger including a pair of connected driving gears, one of said driving gears being drivingly connected to said auger, a drive arm mounted in drive relation to the other of said gears, and having a spring urged pawl in contact with said other gear teeth, said drive arm being rotatable to drive said gear, and a blanking cam associated with said other gear and adapted to blank out portions of gear teeth whereby the amount of rotation of said other gear and said driving gear may be determined thereby determining the rotation of said auger whereby a predetermined and measured amount of said filling material may be supplied to said filling means.

14. An automatic device of the character described adapted to produce various types of bakery goods and portion controlled food products comprising: a frame; a form defining die on said frame for forming bakery dough and the like into desired shape as it passes therethrough; piston means for passing an amount of said bakery dough through said die; cylinder means housing said piston means; control means for said piston means, said control means being adjustable to determine the time of commencement of the forward stroke and the time of termination of the forward stroke of said piston means whereby the termination of dough feed may be effected at a predetermined point; a dough container mounted in delivery position on said piston means; roll means in said dough container adapted to supply a predetermined and measured amount of said dough to said cylinder means for passage through said die; a second piston means mounted to cooperate with said first piston means and adapted to apply a filling material to said dough as it passes through said die; a second cylinder means housing said second piston means; control means for said second piston means, said control means being adjustable to determine the time of commencement of the forward stroke and the time of termination of the forward stroke of said piston means whereby a predetermined application of filling material can be controlled; a filling container mounted in delivery position on said second cylinder means and having disposed therein filling material feed means adapted to feed filling material disposed in said filling container to said second cylinder means; and separate control means for said filling material feed means whereby a predetermined and measured amount of said filling material is applied to said dough.

15. An automatic device of the character described adapted to produce various types of bakery goods and portion controlled food products; comprising: a frame; a form defining die on said frame for forming bakery dough and the like into desired shape as it passes therethrough; a dough piston mounted on said frame for passing a measured amount of said bakery dough through said die; cylinder means housing said dough piston; a piston control including a piston drive mechanism, said control being adjustable to determine the forward stroke and termination point of said piston whereby the cutoff of the dough feed can be controlled; a dough container mounted in delivery position on said dough piston; a pair of rolls disposed in said dough container and controllably rotatable in the same direction for feeding a predetermined and measured amount of said dough to said dough piston for passage through said die; a second filling piston mounted on said frame and adapted to apply a filling material to said dough as it passes through said die; a second cylinder means having said second filling piston; a piston control including a piston drive mechanism, said control being adjustable to determine the forward stroke and termination point of said filling piston whereby the cutoff of the filling feed can be controlled; filling piping extending from said second cylinder means to said die, said piping being adapted to apply said filling to dough passing through said die; and a filling container mounted in delivery position on said second cylinder means, said container having disposed thereunder a rotatable auger adapted to move filling material from said container to said second cylinder means whereby a predetermined and measured amount of said filling material is supplied to said filling piston.

16. An automatic device of the character described adapted to produce various types of bakery goods and portion controlled food products; comprising: a frame; a form defining die on said frame for forming bakery dough and the like into desired shape as it passes therethrough; a piston cylinder mounted on said frame having a discharge opening connected to said die; a piston mounted in said piston cylinder and for reciprocation therein and to pass a measured amount of said bakery dough through said die; piston control apparatus mounted on said frame adjacent said piston cylinder, said control apparatus including a drive mechanism, said drive mechanism including a drive gear connected in driving contact with said piston, a drive arm attached to said drive gear adapted on motion in one direction to rotate said gear through a predetermined arc to thereby drive said piston forward, and a pin mounted on said drive gear in the path of said drive arm whereby on motion in the other direction of said drive arm, said pin will be contacted and moved to substantially the same position after each reciprocal stroke thereby locating said piston in substantially the same position after each stroke; a dough container mounted in delivery position on said dough piston cylinder; a pair of rolls mounted in said container, said rolls being rotatable in the same direction to move an amount of dough therethrough; control means for controlling the amount of rotation of said rolls whereby a predetermined and measured amount of said dough is moved therethrough to said dough piston for passage through said die; a second piston cylinder mounted on said frame and having a discharge opening connected to a filling piping; a second piston mounted in said second piston cylinder for reciprocation therein and to pass a measured and predetermined amount of filling through said filling piping; a second piston control apparatus mounted on said frame adjacent said piston cylinder, said second control apparatus including a drive mechanism; said drive mechanism including a drive gear connected in driving contact with said piston and a drive arm attached to said drive gear adapted on motion in one direction to rotate said gear through a predetermined arc to thereby drive said piston forward; a pin mounted on said drive gear in the path of said drive arm whereby on motion in the other direction of said drive arm said pin will be contacted and moved to substantially the same position after each reciprocal stroke; said filling piping being connected to said die whereby said filling may be applied to the exterior and interior of said bakery products; a container mounted in delivery position on said filling piston cylinder, said container having disposed thereunder a rotatable auger adapted to move filling material from said container to said filling piston; and control means associated with said auger, said control means including drive means for said auger, said control means being for controlling said drive means and thereby said auger rotation whereby a predetermined and measured amount of said filling material may be supplied to said filling piston.

17. The device of claim 16 wherein said piston control apparatus for each of said pistons and said auger includes blanking cams adjustable to limit the drive stroke of said drive arms and thereby the stroke of said piston.

18. An automatic device of the character described adapted to produce various types of bakery goods and portion controlled food products; comprising: a frame; a form defining die on said frame for forming bakery dough and the like into desired shape as it passes therethrough; a piston cylinder mounted on said frame having a discharge opening connected to said die; a piston mounted in said piston cylinder and for reciprocation therein and to pass an amount of said bakery dough through said die; a drive rack connected to the drive end of said piston; a piston control apparatus mounted on said frame adjacent said piston cylinder, said control apparatus including a drive mechanism; said drive mechanism including a pair of connected driving gears, one of said gears being disposed in driving contact with said piston rack; and a drive arm having a spring loaded pawl thereon located in driving connection with said other gear, said drive arm being adapted on motion in one direction to rotate through an arc to drive said other gear through said spring loaded pawl; a pin mounted on said other gear in the path of said drive arm whereby on the movement in the other direction of said drive arm said pin will be contacted and moved to substantially the same position after each reciprocal stroke thereby locating said piston in the same position; a blanking cam mounted over said other gear and adapted to blank out a portion of the gear teeth whereby on the stroke of said drive arm said spring loaded pawl will be unable to contact a predetermined portion of said other gear thereby terminating the forward drive stroke of said piston and determining the length of said forward stroke; a dough container mounted in delivery position on said dough piston cylinder; a pair of rolls having corrugated surfaces mounted in said container, said rolls being rotatable toward each other to move an amount of dough therethrough; control means for determining the amount of rotation of said rolls, said control means including a first pair of gears in driving contact with each other and connected to said rolls and a second gear connected to one of said pair of gears; a drive arm associated with said second gear having a spring loaded drive pawl connected thereto and adapted to drive said second gear on arcuate movement of said drive arm; a movable cam plate covering a portion of said second gear and adapted to blank out a predetermined amount of gear teeth on said second gear whereby the pawl is unable to contact certain of said teeth thereby decreasing the amount of rotation of said gears and said rolls and thus the amount of dough feed; a second piston cylinder mounted on said frame having a discharge opening connected to a filling piping; a second piston mounted in said second piston cylinder adapted to reciprocate therein and to pass a measured and predetermined amount of filling material into said filling piping; a drive rack connected to the drive end of said piston; a second piston control apparatus mounted on said frame adjacent said piston cylinder, said second control apparatus including a drive mechanism; said drive mechanism including a pair of connected driving gears, one of said gears being disposed in driving contact with said piston rack; a drive arm having a spring loaded pawl thereon located in driving connection with said other gear, said drive arm being adapted on motion in one direction to rotate through an arc to drive said other gear through said spring loaded pawl; a pin mounted on said other gear in the path of said drive arm whereby on the movement in the other direction of said drive arm said pin will be contacted and moved to substantially the same position after each reciprocal stroke thereby bottoming said piston in the same position; a pair of blanking cams mounted over said other gear and adapted to blank out a portion of said gear teeth whereby on the stroke of said drive arm said spring loaded pawl will be unable to contact a predetermined portion of said gear teeth thereby determining the beginning and the end of the stroke of said piston; a container mounted in delivery position on said filling means, said container having disposed thereunder a rotatable auger adapted to move filling material from said container to said filling means; a drive control for said auger including a pair of connected driving gears, one of said driving gears being drivingly connected to said auger; a drive arm mounted in drive relation to the other of said gears and having a spring urged pawl in contact with said other gear, said drive arm being rotatable through an arc to drive said gear; and a blanking cam associated with said other gear and adapted to blank out a portion of said gear teeth whereby the amount of rotation of said other gear and said driving gear may be determined thereby determining the rotation of said auger whereby a predetermined and measured amount of said filling material may be supplied to said filling piping.

19. An automatic cutting and conveying device of the character described comprising: severing means for separating products into units; a conveyor mounted adjacent said severing means and means for moving said conveyor across the path of and out of said path of said severing means to support said units before they are severed and after they are severed to carry said units away from said device.

20. An automatic device of the character described adapted to produce various types of bakery goods and portion controlled food products; comprising: severing means, said severing means including a pair of cutting blades; said cutting blades being adapted to separate said products into individual units as said dough emerges from said die; and a conveyor, including a conveyor belt, mounted adjacent said die and said severing means, and means for moving said conveyor across the path of and out of said path of said severing means to receive said individual units after they are severed and to carry said units away from said device.

21. An automatic device of the character described adapted to produce various types of bakery goods and portion controlled food products; comprising: a frame; a form defining die on said frame for forming bakery dough and the like into desired shape as it passes therethrough; a severing device mounted in cooperation with said die, said severing device including a pair of substantially complementary cutting blades; one of said cutting blades having an upstanding central cutting portion; said blades being reciprocally movable toward and away from each other and mateable during cutting whereby they are adapted to separate said dough into individual units as it emerges from said die; a movable conveyor, including a conveyor belt, mounted on said frame adjacent said die and said severing means; and driving means for said conveyor, said driving means being for moving said conveyor toward and away from the jaws of said severing device whereby said conveyor enters the jaws when said blades are open and leaves said jaws as they close whereby individual units may be removed and carried away by said conveyor as they emerge from said die.

22. A piston locating control comprising: a driving gear for said piston drivingly connected thereto; a driving arm associated with said gear and adapted on motion in one direction to drive said gear and said piston in one direction; and a pin located on said driving gear in the path of said drive arm whereby on motion in the other direction of said drive arm, said drive arm contacts said pin and moves said gear and said piston to a predetermined position thereby locating said piston in substantially the same beginning position.

23. An automatic device of the character described adapted to produce various types of bakery goods and portion controlled food products, comprising: a frame; a form defining die on said frame for forming bakery dough and the like into desired shape as it passes therethrough; a piston cylinder mounted on said frame having its discharge opening connected to said die; a piston mounted in said piston cylinder for reciprocation therein to pass a measured amount of said bakery dough through said die; a piston control apparatus mounted on said frame adjacent said piston cylinder, said control apparatus including a drive mechanism; said drive mechanism including a drive gear connected in driving relation with said piston, a drive arm having a pawl engaging said drive gear and adapted on motion of said arm in one direction to rotate said gear through a predetermined arc to thereby drive said piston forward, and a pin mounted on said drive gear in the path of said drive arm whereby on motion in the other direction of said drive arm, said pin will be contacted and moved to substantially the same position after each forward stroke thereby locating said piston in substantially the same position after each stroke; and means operating in conjunction with said piston for applying a filling material to said dough.

24. An automatic device of the character described adapted to produce various types of bakery goods and portion controlled food products, comprising: a frame; means on said frame for forming bakery dough and the like into desired shape; a piston cylinder mounted on said frame having a discharge opening; filling piping connected to said cylinder adjacent said discharging opening and in communication therewith; a piston mounted in said piston cylinder and adapted to reciprocate therein to pass a measured and predetermined amount of filling material through said filling piping; a piston control apparatus mounted on said frame adjacent said piston cylinder, said control apparatus including a drive mechanism; said drive mechanism including a drive gear connected in driving relation with said piston and a drive arm having a pawl engaging said drive gear and adapted on motion of said arm in one direction to rotate said gear through a predetermined arc to thereby drive said piston forward; a pin mounted on said drive gear in the path of said drive arm whereby on motion in the other direction of said drive arm said pin will be contacted and moved to substantially the same position after each forward stroke; and said filling piping being connected to said forming means whereby said filling material may be applied to said bakery dough.

25. An automatic device of the character described adapted to produce various types of bakery goods and portion controlled food products, comprising: severing means for separating products into units; a conveyor, including a conveyor belt, mounted adjacent said severing means; and means for reciprocably moving the entire conveyor across the path of and out of said path of said severing means to receive said units after they are severed and to carry said units away from said device.

26. A piston locating control comprising: a drive rack connected to a piston, a pair of connected driving gears, one of said gears being disposed in driving contact with said piston rack, a drive arm having a spring loaded pawl thereon located in driving connection with said other gear, said drive arm being adapted on motion in one direction to rotate through an arc to drive said other gear through said spring loaded pawl; a pin mounted on said other gear in the path of said drive arm whereby on the movement in the other direction of said drive arm, said pin will be contacted and moved to substantially the same position after each cycle of said piston thereby locating said piston in substantially the same beginning position.

27. A piston locating control comprising: a drive rack connected to a piston, a pair of connected driving gears, one of said gears being disposed in driving contact with said piston rack, a drive arm having a spring loaded pawl thereon located in driving connection with said other gear, said drive arm being adapted on motion in one direction to rotate through an arc to drive said other gear through said spring loaded pawl; a pin mounted on said other gear in the path of said drive arm whereby on the movement in the other direction of said drive arm, said pin will be contacted and moved to substantially the same position after each reciprocal stroke thereby locating said piston in substantially the same beginning position; and a pair of blanking cams mounted over said other gear and adapted to shield a portion of said gear teeth whereby on the stroke of said drive arm in said one direction, said spring loaded pawl will be unable to contact a predetermined portion of said gear teeth thereby determining the beginning and end of the stroke of said piston.

28. An automatic device of the character described adapted to produce various types of bakery goods and portion controlled products comprising: a frame; a form defining die on said frame for forming bakery dough and the like into desired shape as it passes therethrough; severing means mounted in cooperation with said die for separating said products into individual units as said dough emerges from said die; a conveyor, including a conveyor belt, mounted on said frame adjacent said die and said severing means; and means for moving said conveyor across the path of and out of the path of said severing means to support said units before they are severed and after they are severed to carry said units away from said device.

References Cited by the Examiner

UNITED STATES PATENTS

| | | | |
|---|---|---|---|
| 422,039 | 2/1890 | Ruger | 107—68 |
| 544,962 | 8/1895 | Copland | 107—1 |
| 602,042 | 4/1898 | Dodge | 31—20 X |
| 719,413 | 2/1903 | Anderson | 31—14 |
| 724,287 | 3/1903 | Heilmann | 18—13 |
| 729,933 | 6/1903 | Heilmann-Taylor | 107—1 |
| 1,754,885 | 4/1930 | Frings | 31—14 |
| 1,932,345 | 10/1933 | Kremmling | 107—29 |
| 1,933,557 | 11/1933 | Kalvin | 107—14.1 X |
| 2,660,131 | 11/1953 | Elliott | 107—29 X |
| 2,667,130 | 1/1954 | Kottmann et al. | 107—29 X |
| 2,703,536 | 3/1955 | Baker | 107—14 |
| 2,712,291 | 7/1955 | Groff | 107—14 |
| 2,736,922 | 3/1956 | Schieser. | |
| 2,850,990 | 9/1958 | Rasmusson | 107—1 |

WALTER A. SCHEEL, *Primary Examiner.*

JOSEPH D. BEIN, ROBERT E. PULFREY, *Examiners.*

JOSEPH SHEA, *Assistant Examiner.*